(12) United States Patent
Song

(10) Patent No.: US 10,045,429 B2
(45) Date of Patent: Aug. 7, 2018

(54) LIGHT CONTROL APPARATUS AND LIGHT CONTROL METHOD THEREOF

(71) Applicant: LG Innotek Co., Ltd., Seoul (KR)

(72) Inventor: Seung Hwan Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/505,455

(22) PCT Filed: Jul. 28, 2015

(86) PCT No.: PCT/KR2015/007898
§ 371 (c)(1),
(2) Date: Feb. 21, 2017

(87) PCT Pub. No.: WO2016/028004
PCT Pub. Date: Feb. 25, 2016

(65) Prior Publication Data
US 2017/0265286 A1 Sep. 14, 2017

(30) Foreign Application Priority Data
Aug. 18, 2014 (KR) ........................ 10-2014-0107018

(51) Int. Cl.
*G06F 3/0482* (2013.01)
*H05B 37/02* (2006.01)
(Continued)

(52) U.S. Cl.
CPC ....... *H05B 37/0272* (2013.01); *G06F 3/0482* (2013.01); *G06F 3/04817* (2013.01); *G06F 3/04847* (2013.01); *G06F 3/04886* (2013.01)

(58) Field of Classification Search
CPC ................ H05B 33/08; H05B 33/0842; H05B 33/0845; H05B 33/0863; H05B 37/02;
(Continued)

(56) References Cited

U.S. PATENT DOCUMENTS 9,137,877 B2 * 9/2015 Kim .................. H05B 37/0227
2005/0097478 A1 5/2005 Killian et al.
(Continued)

FOREIGN PATENT DOCUMENTS

KR 20100029360 A 3/2010
KR 101111731 B1 3/2012
(Continued)

OTHER PUBLICATIONS

International Search Report in International Application No. PCT/KR2015/007898, filed Jul. 28, 2015.

*Primary Examiner* — Thai Pham
(74) *Attorney, Agent, or Firm* — Saliwanchik, Lloyd & Eisenschenk

(57) ABSTRACT

According to one embodiment, there is provided a light control apparatus which includes: a touch screen to display a graphical user interface for controlling a light; and a wireless communication unit performing communication with a light and transmitting a control signal set through the graphical user interface to the corresponding light, wherein the graphical user interface includes a first area displaying a name of the light, and a second area displaying location information of the light selected from the first area, and the location information is spot information about an actual installed location of the light selected from the first area.

12 Claims, 28 Drawing Sheets

(51) Int. Cl.
*G06F 3/0481* (2013.01)
*G06F 3/0488* (2013.01)
*G06F 3/0484* (2013.01)

(58) Field of Classification Search
CPC ............... H05B 37/0272; G06F 3/0481; G06F 3/04817; G06F 3/0482; G06F 3/0484; G06F 3/04847; G06F 3/0488; G06F 3/04886
See application file for complete search history.

(56) References Cited

U.S. PATENT DOCUMENTS

| | | | |
|---|---|---|---|
| 2012/0126721 | A1 | 5/2012 | Kuenzler et al. |
| 2012/0284672 | A1* | 11/2012 | Madonna ........... H05B 37/0245 715/850 |
| 2012/0306378 | A1 | 12/2012 | Oh et al. |
| 2012/0320262 | A1* | 12/2012 | Chung ............... H05B 33/0863 348/370 |
| 2014/0043791 | A1* | 2/2014 | Diederiks ............. G06F 3/0481 362/85 |
| 2014/0070707 | A1* | 3/2014 | Nagazoe ............. H04B 10/116 315/151 |

FOREIGN PATENT DOCUMENTS

| | | |
|---|---|---|
| KR | 20140031045 A | 3/2014 |
| WO | WO-2011053089 A2 | 5/2011 |

\* cited by examiner

Prior Art
【FIG. 1】
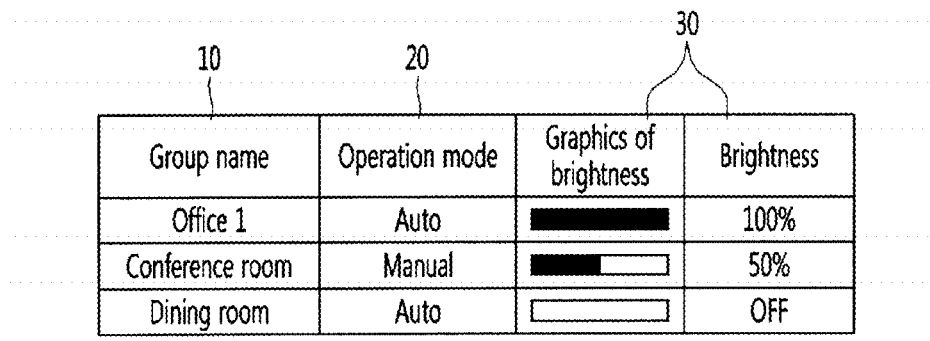
【FIG. 2】
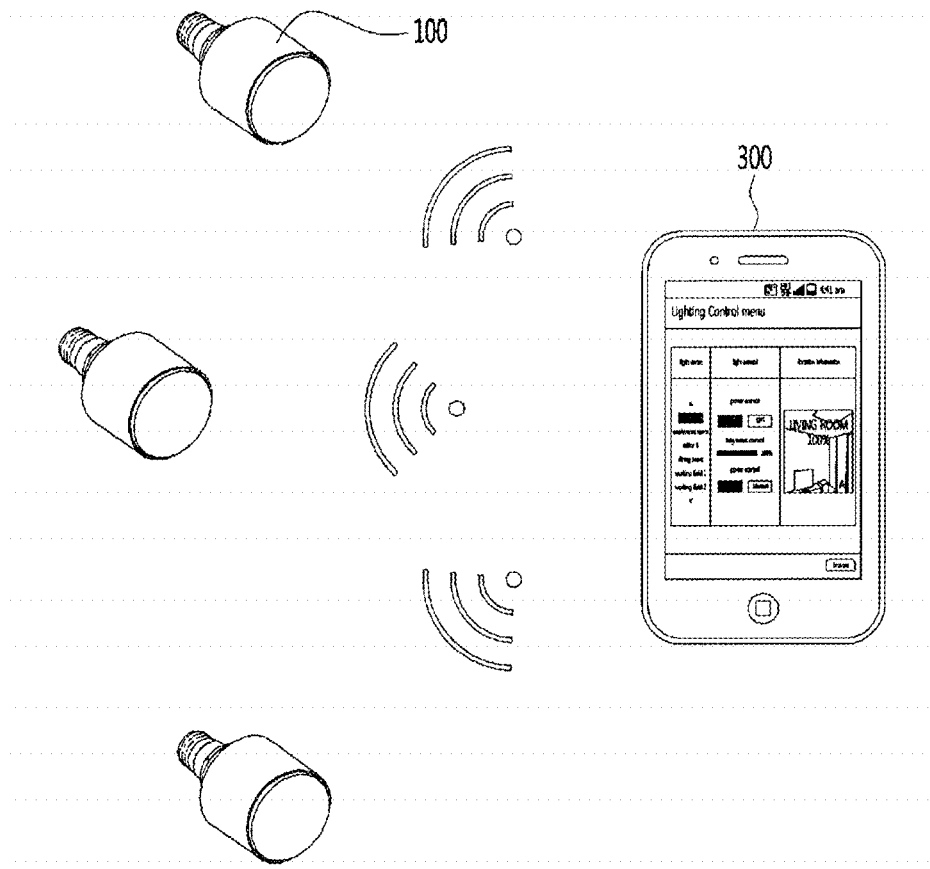

[FIG. 3]
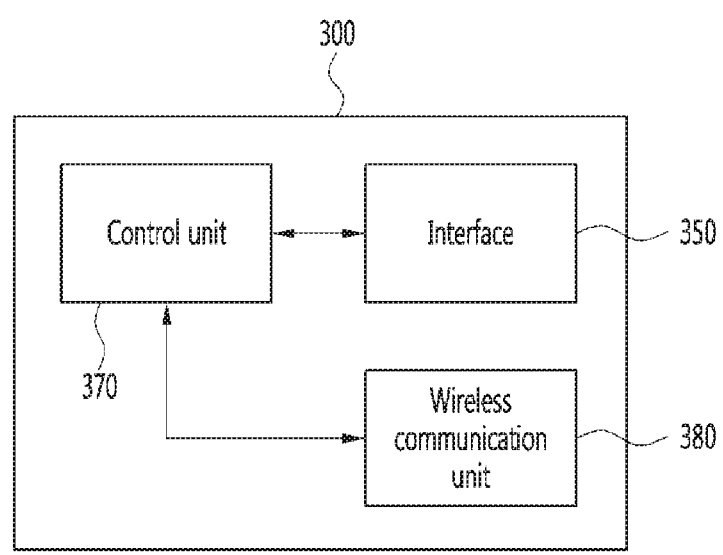

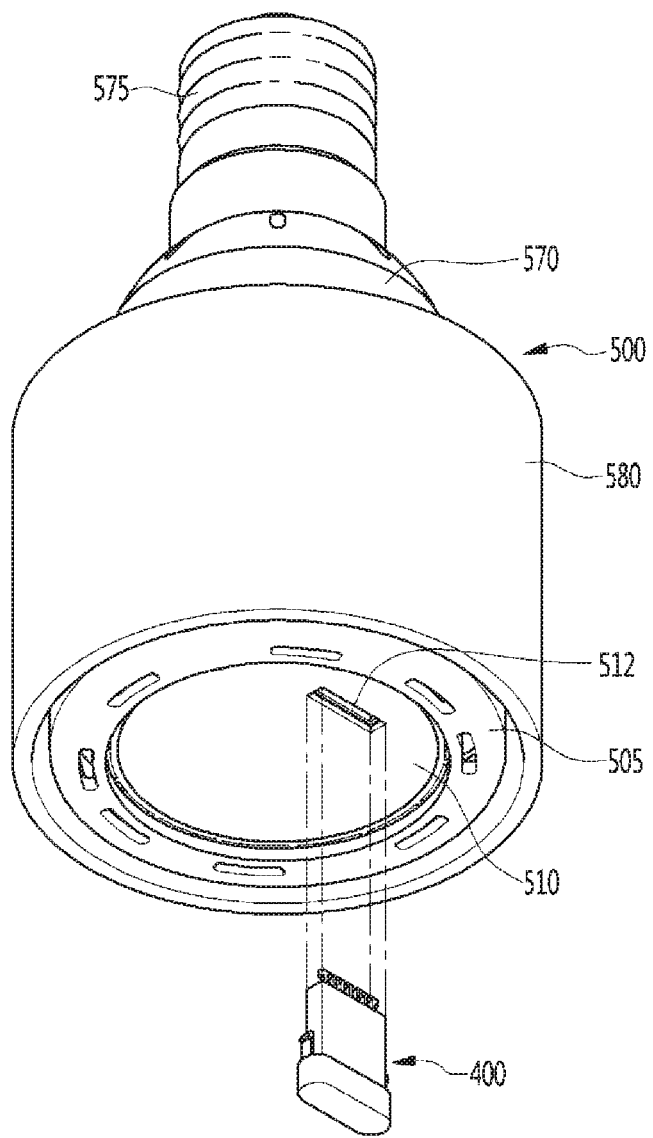
[FIG. 4]

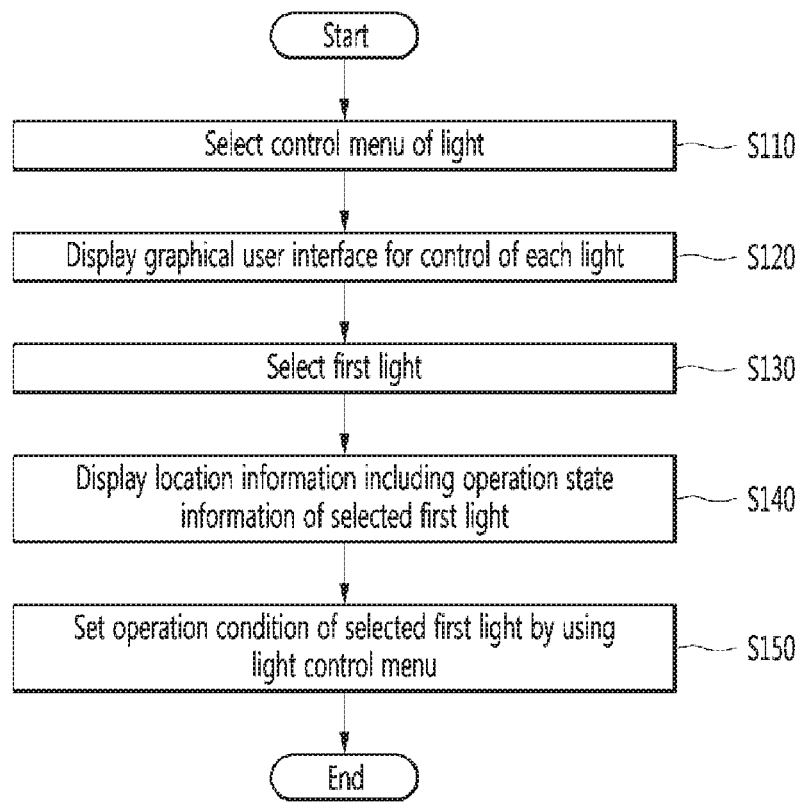

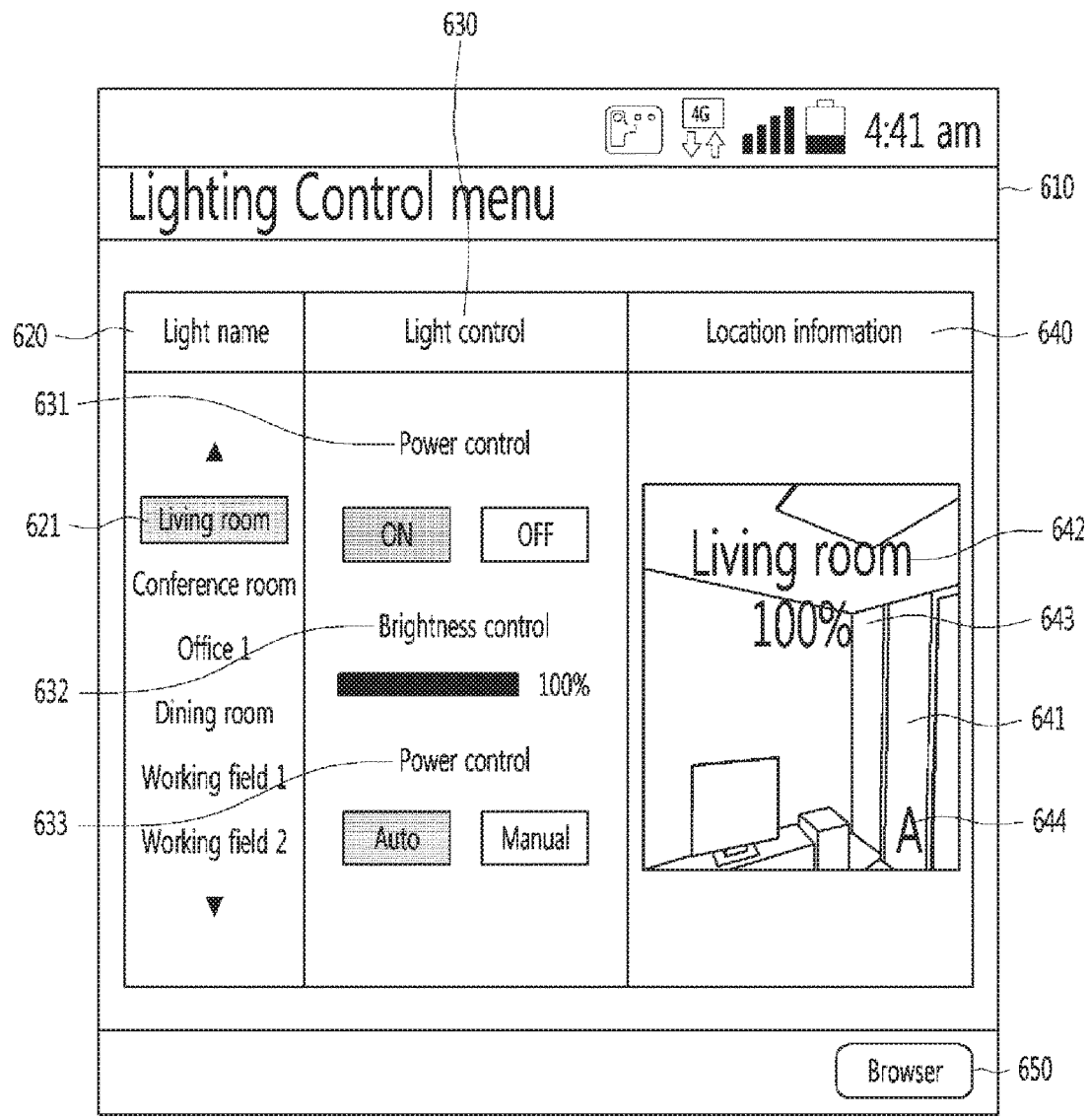

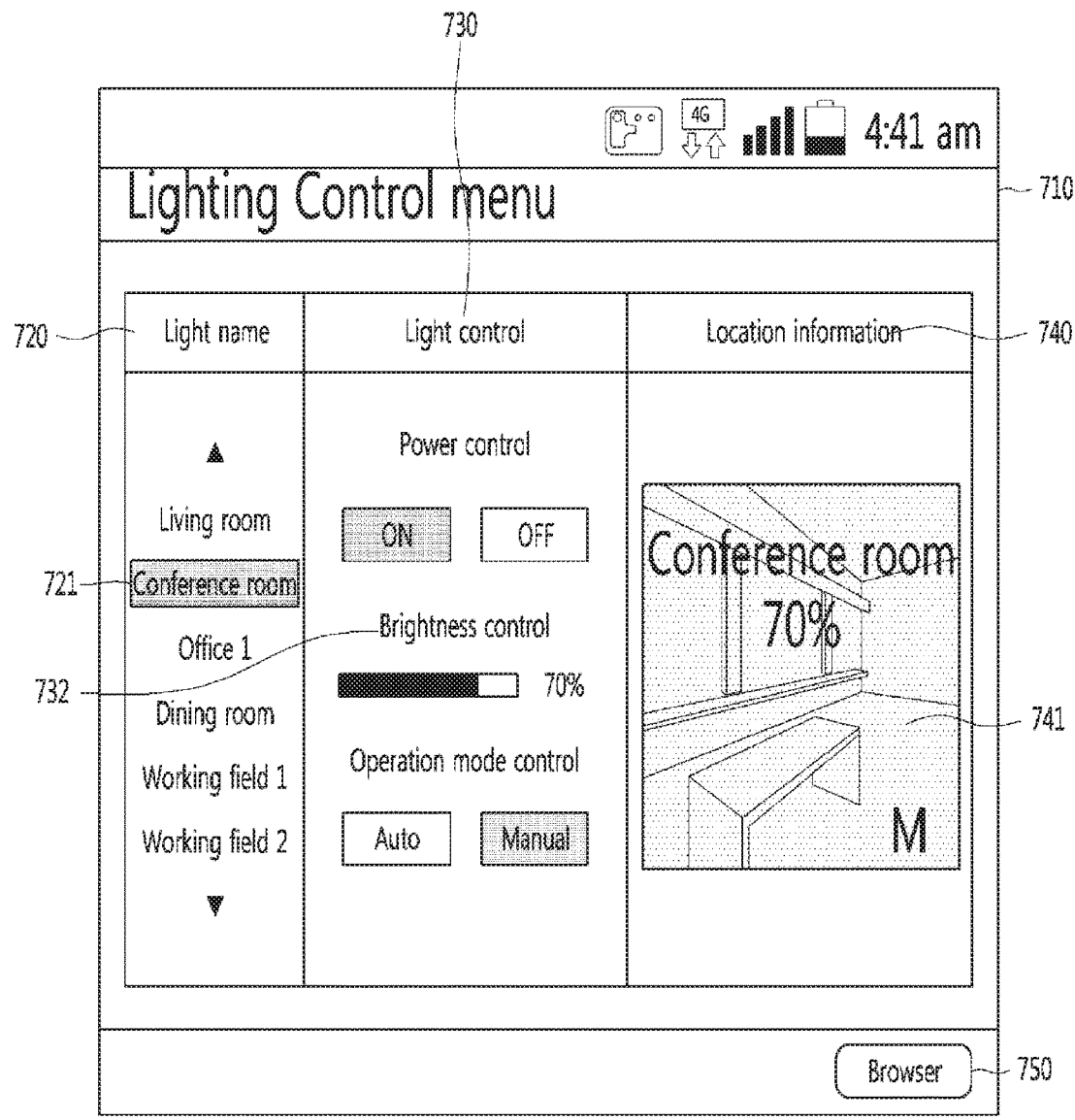
[FIG. 7]

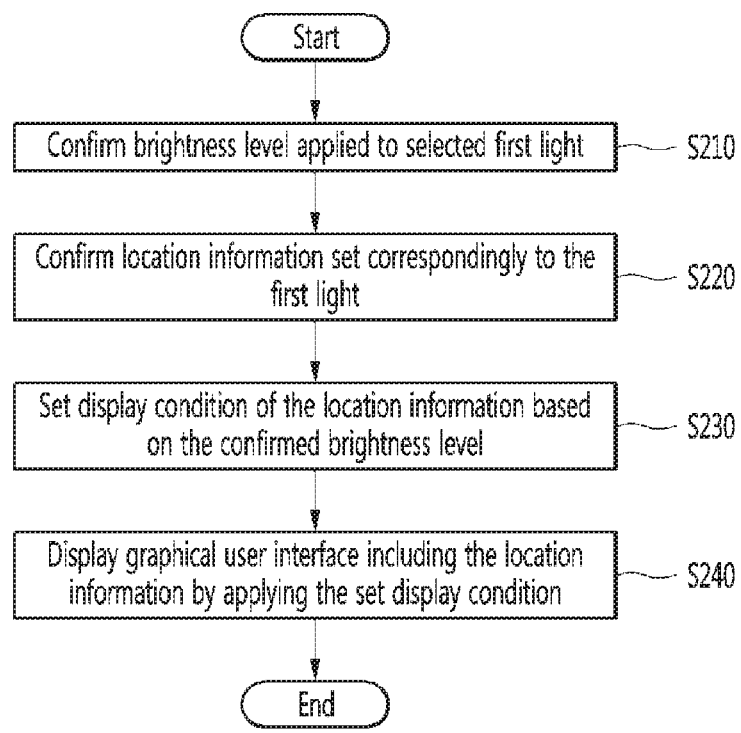
[FIG. 8]

[FIG. 9]
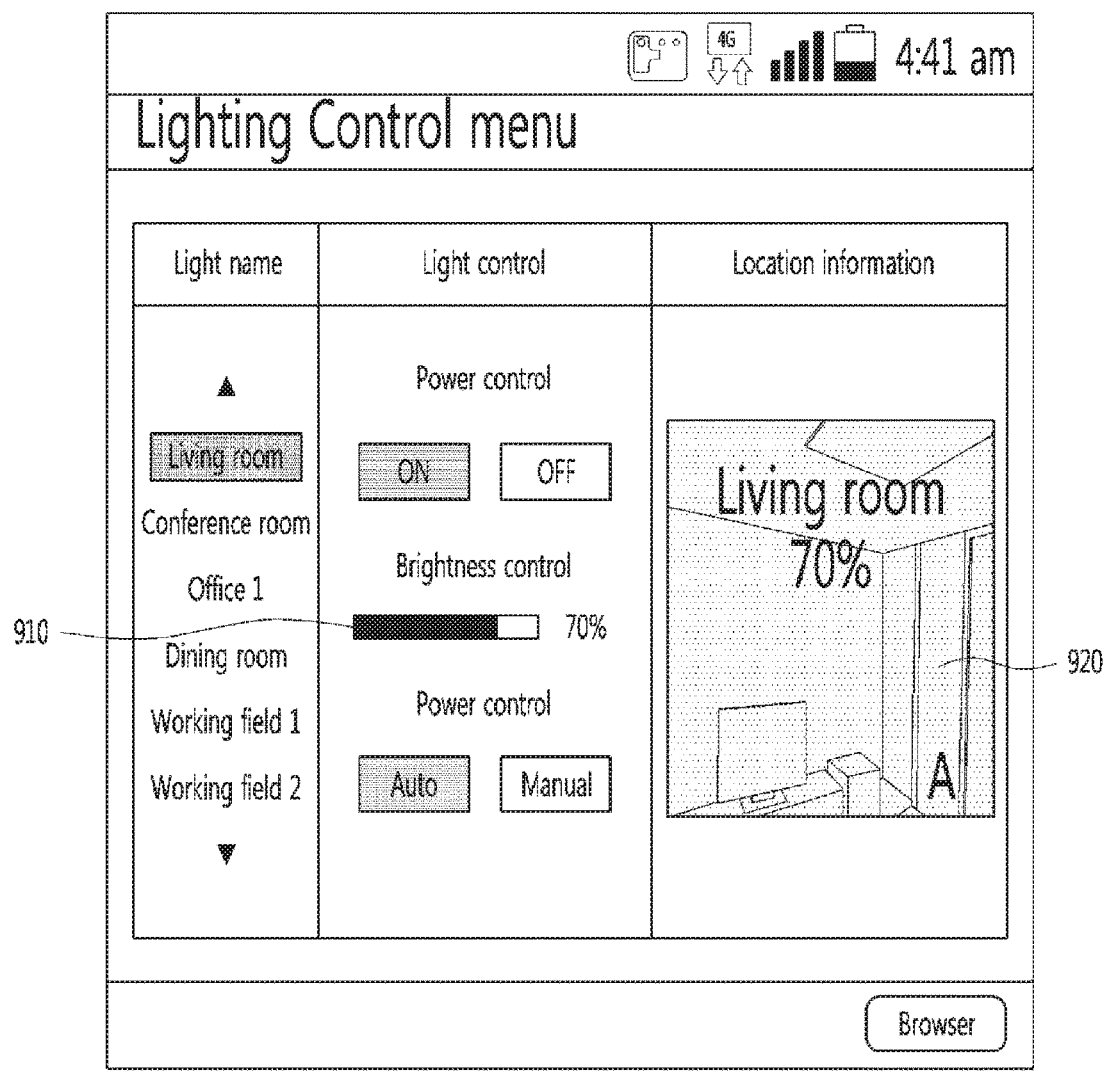

[FIG. 10]
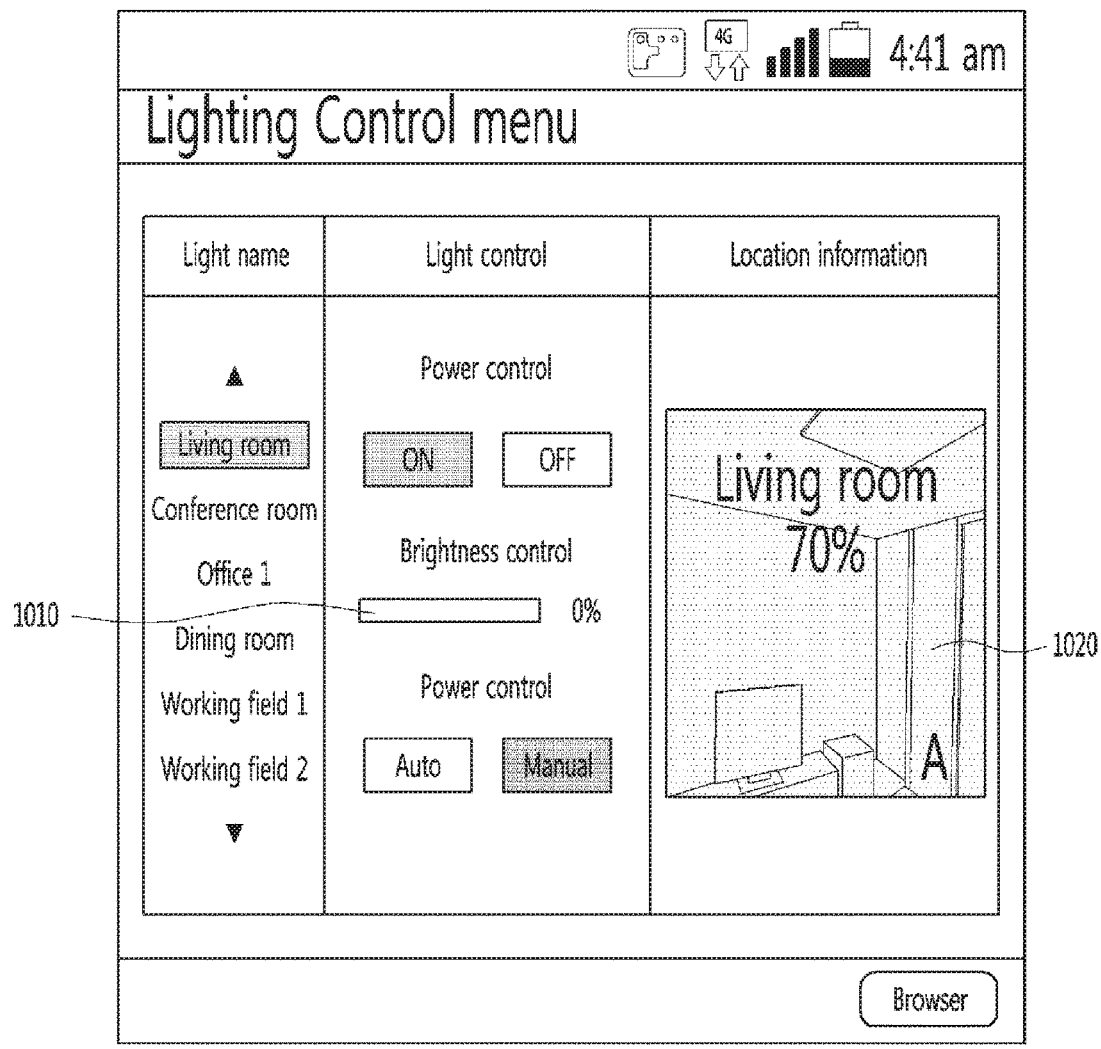

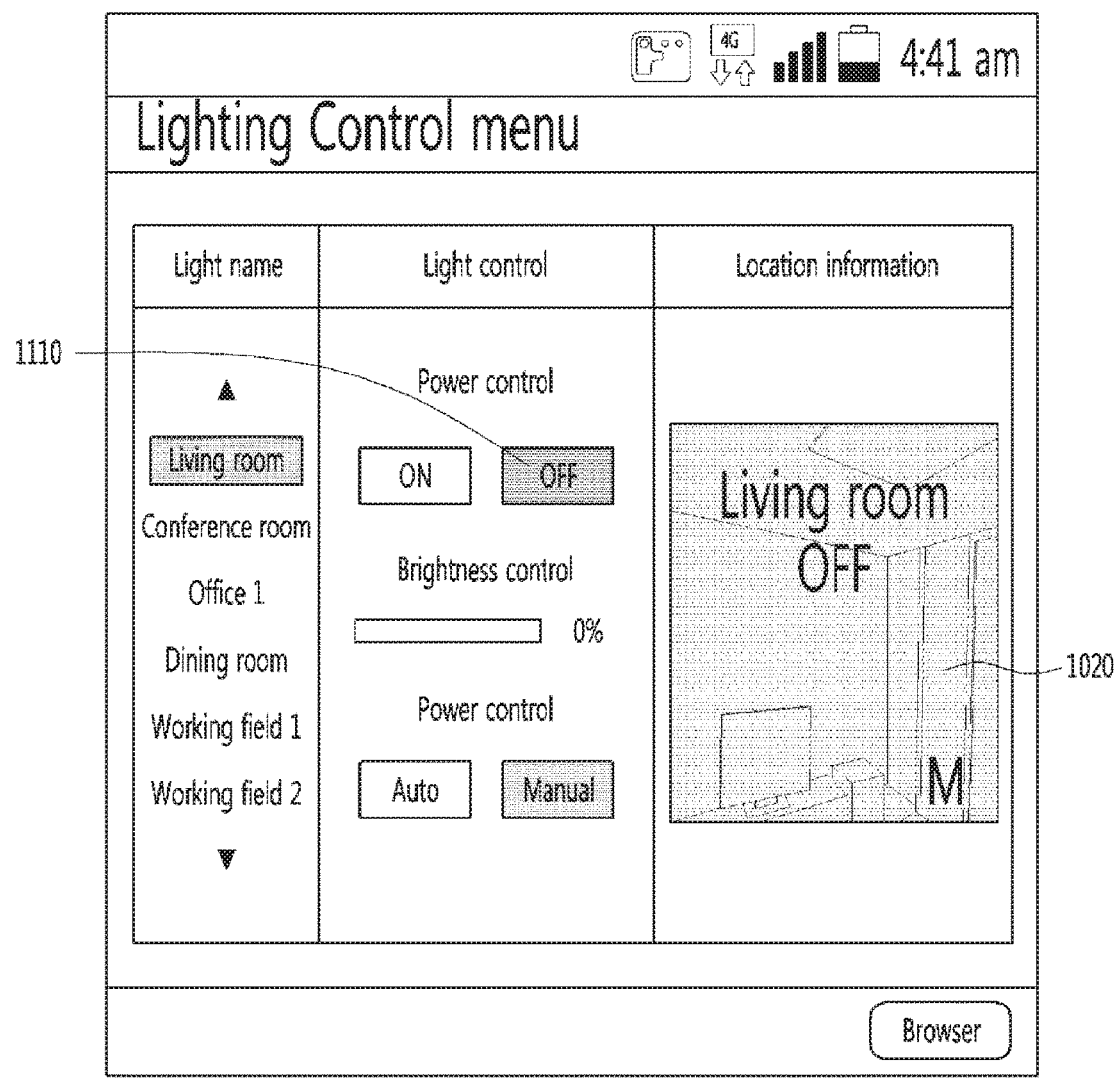
[FIG. 11]

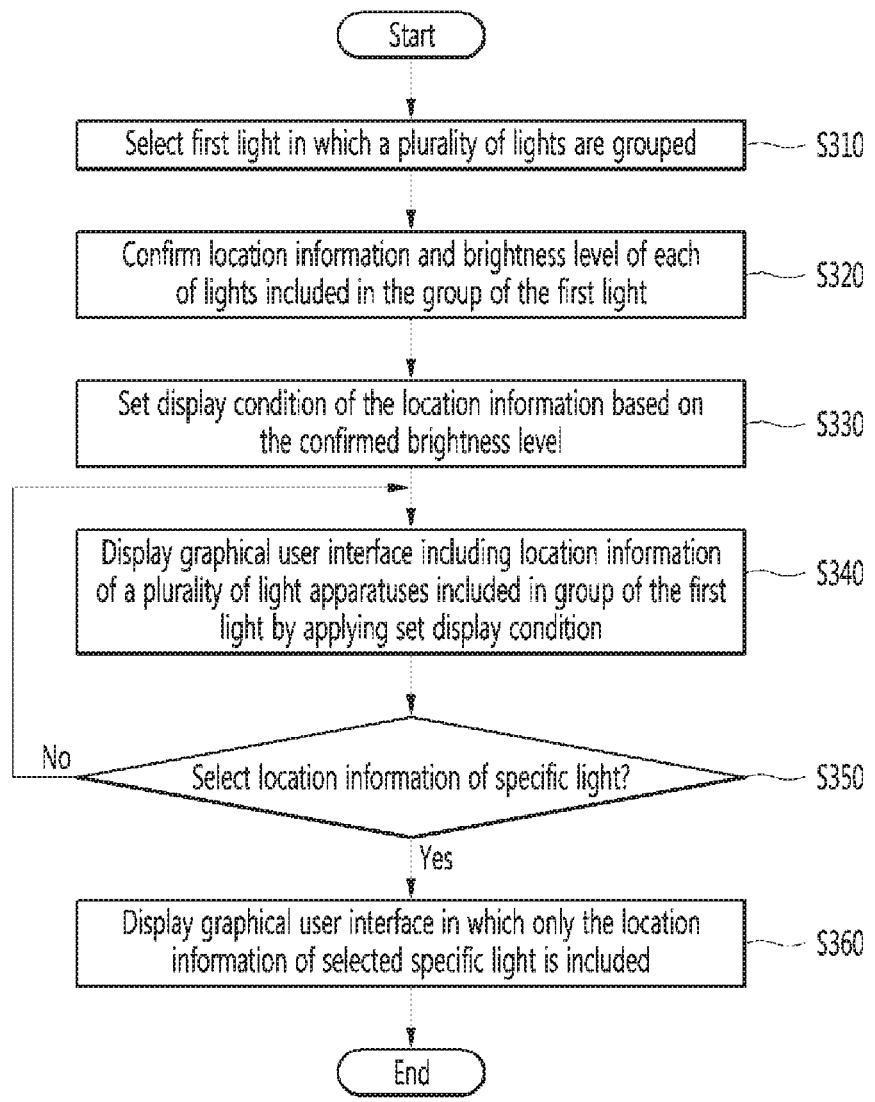
[FIG. 12]

[FIG. 13]
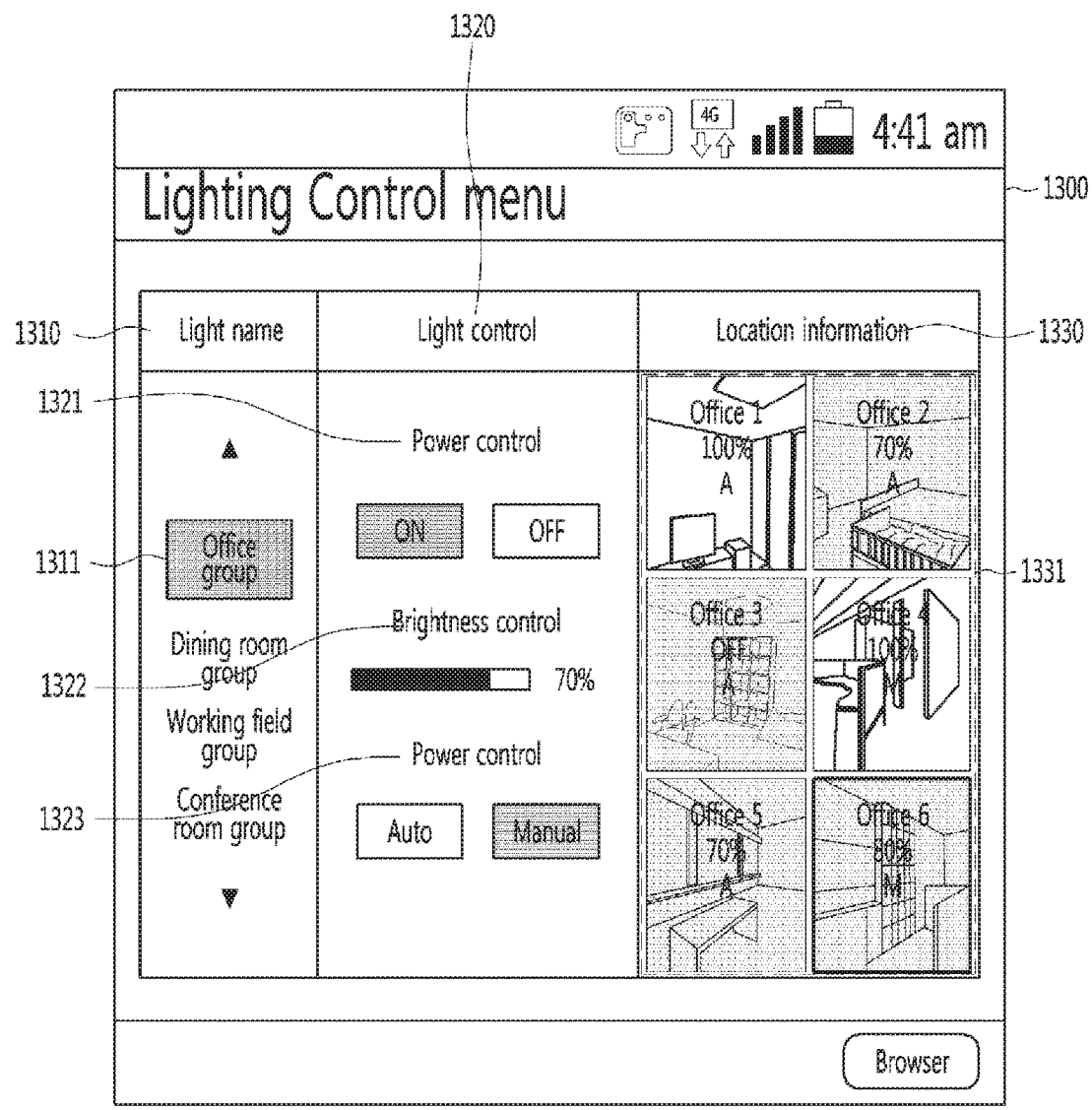

[FIG. 14]
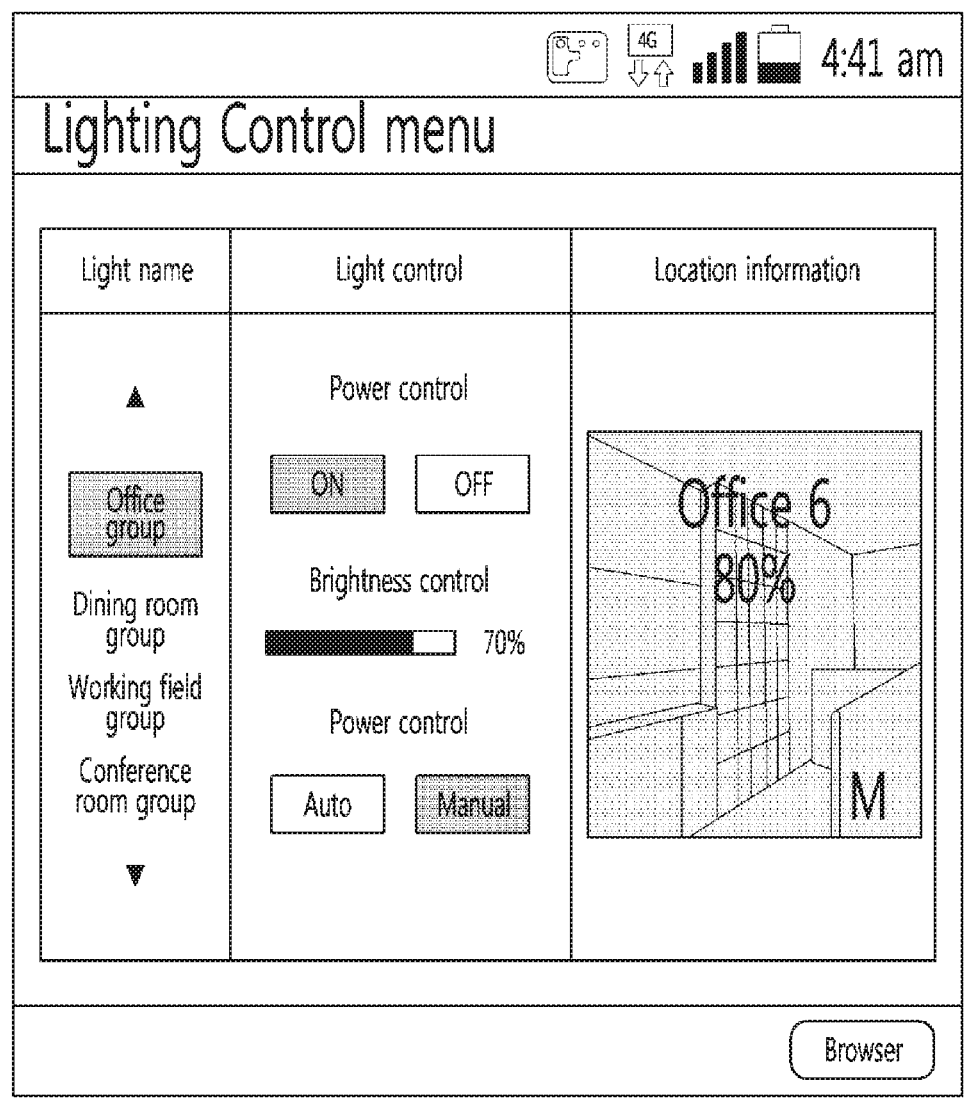

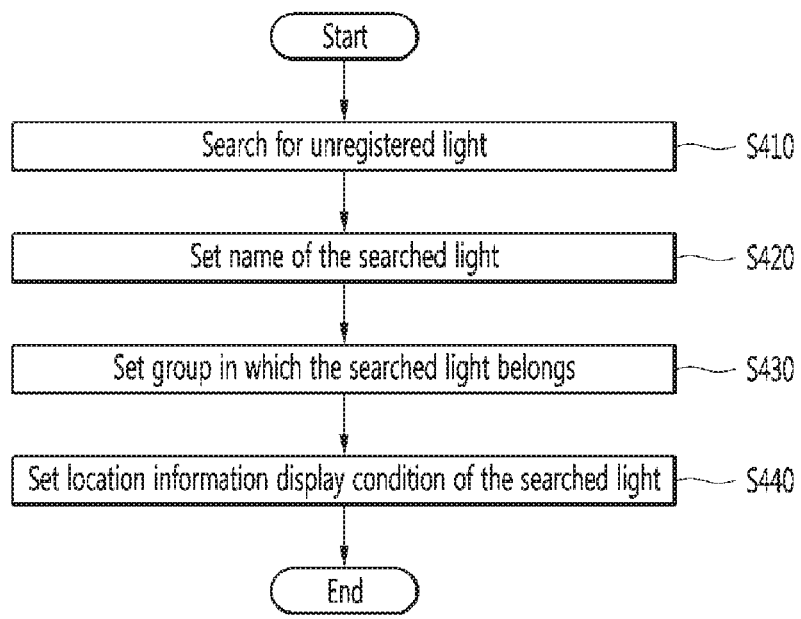
[FIG. 15]

[FIG. 16]
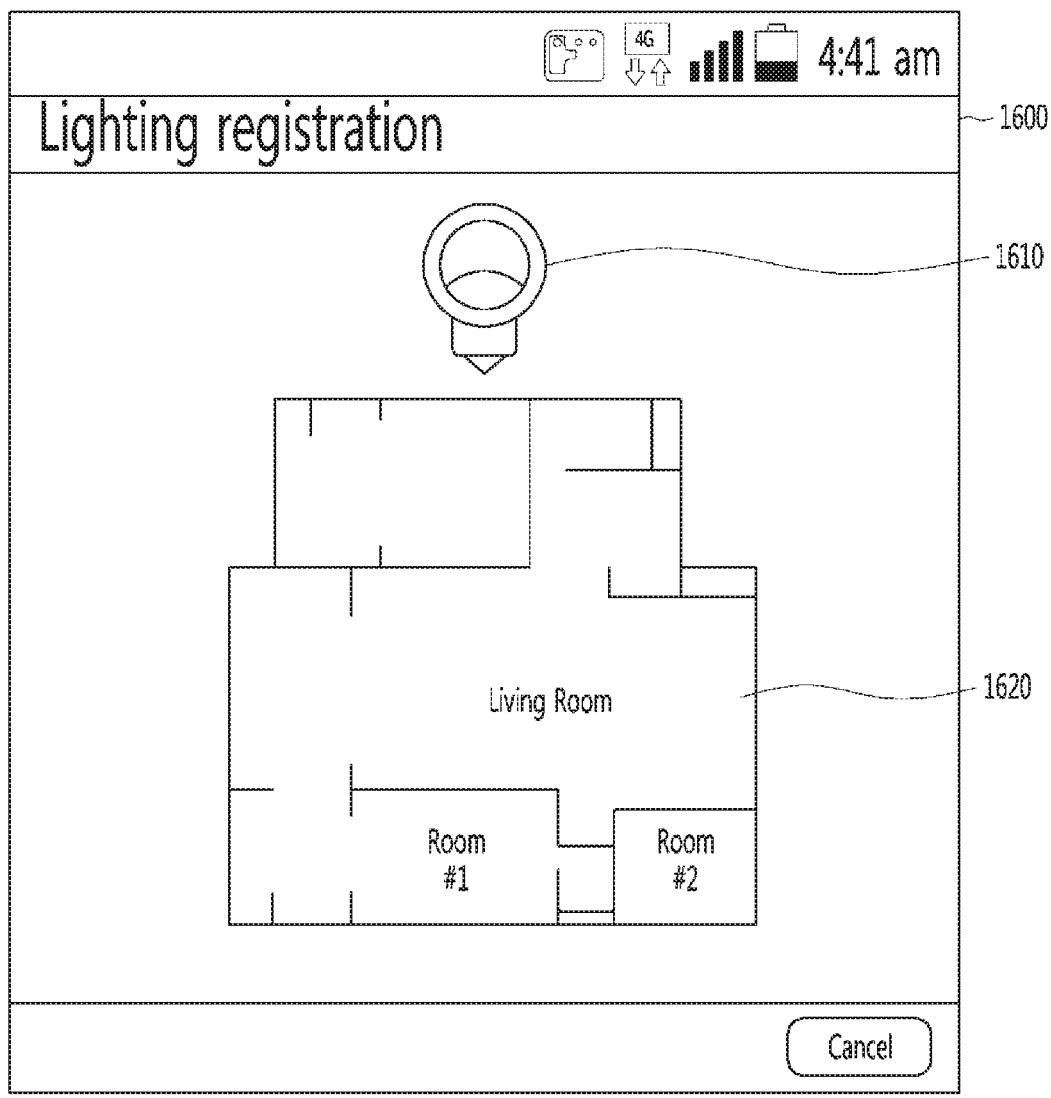

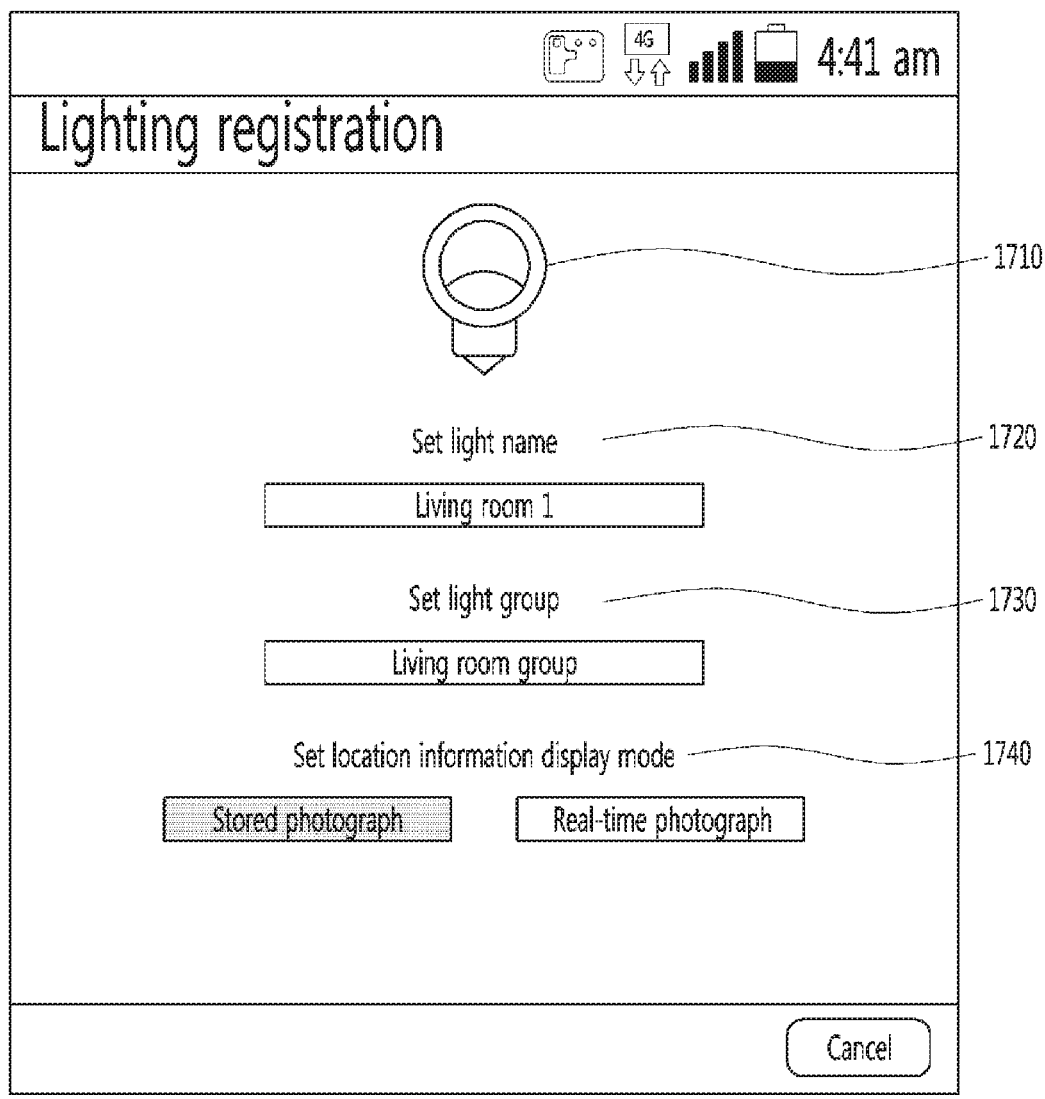
[FIG. 17]

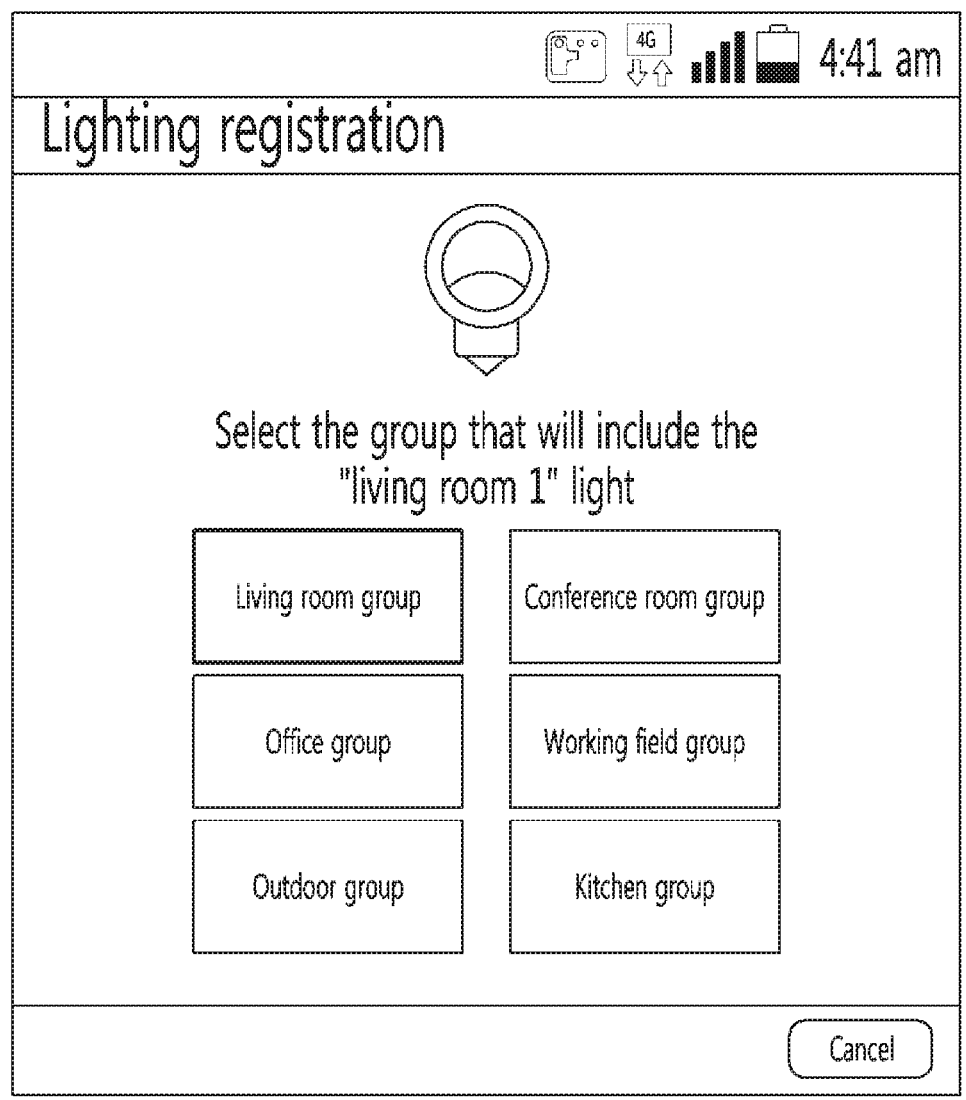
[FIG. 18]

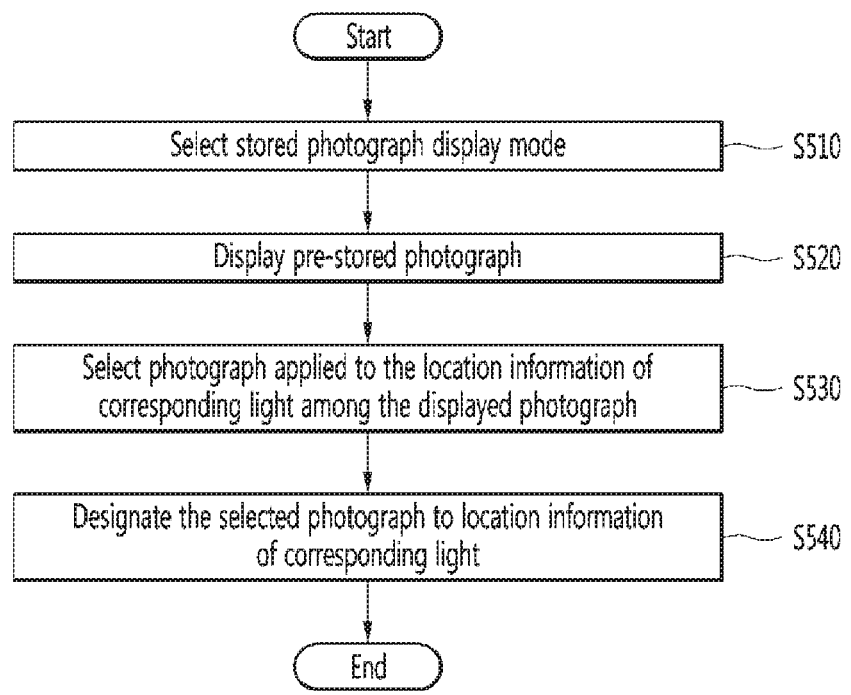

[FIG. 20]
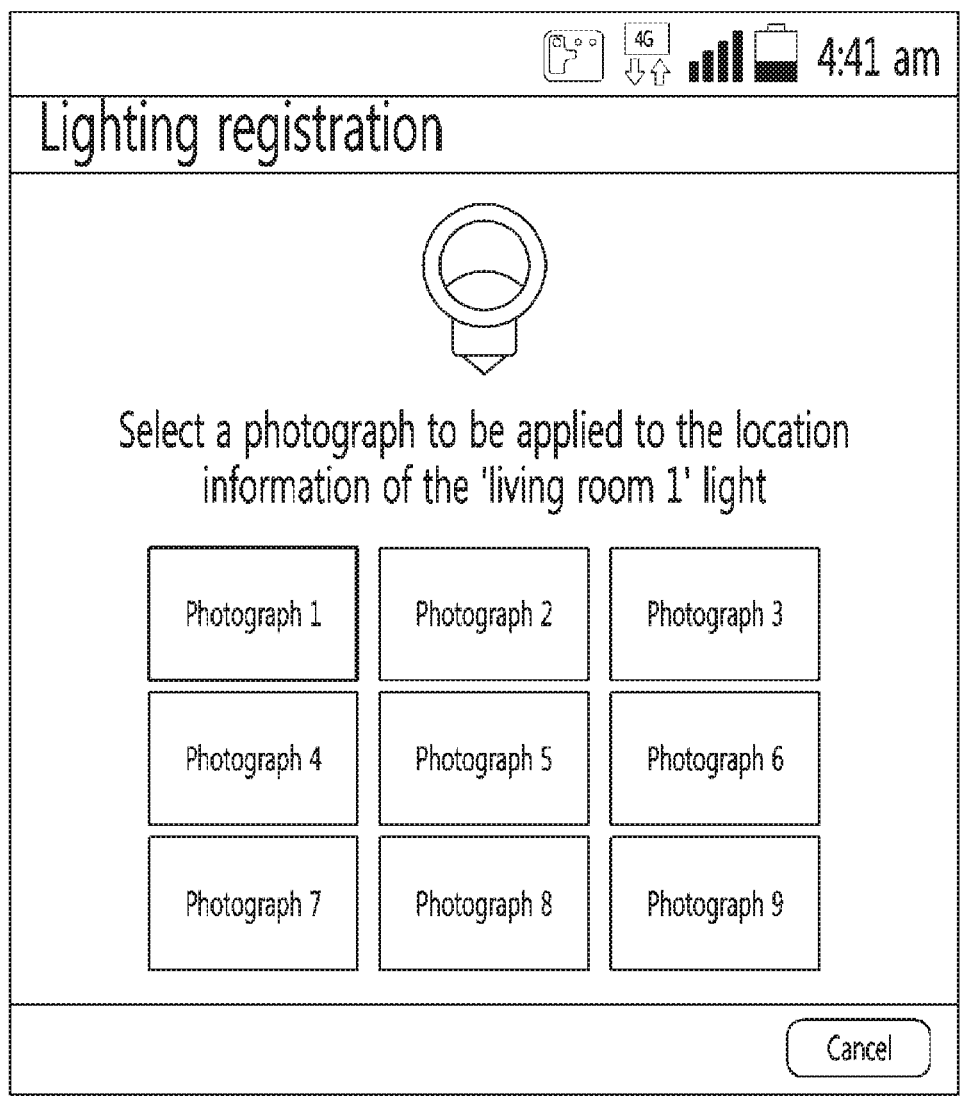

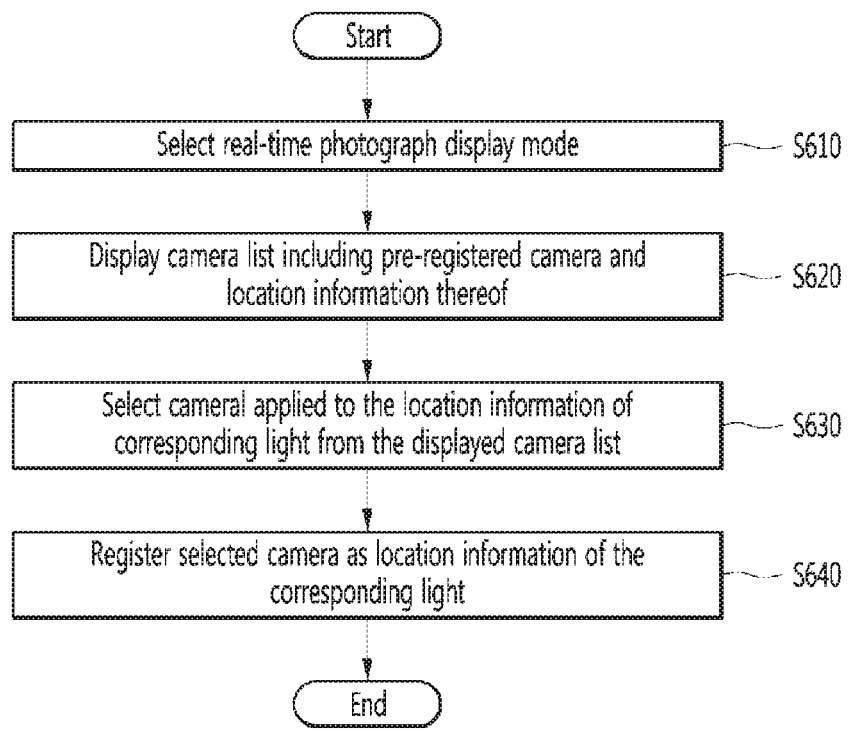
[FIG. 21]

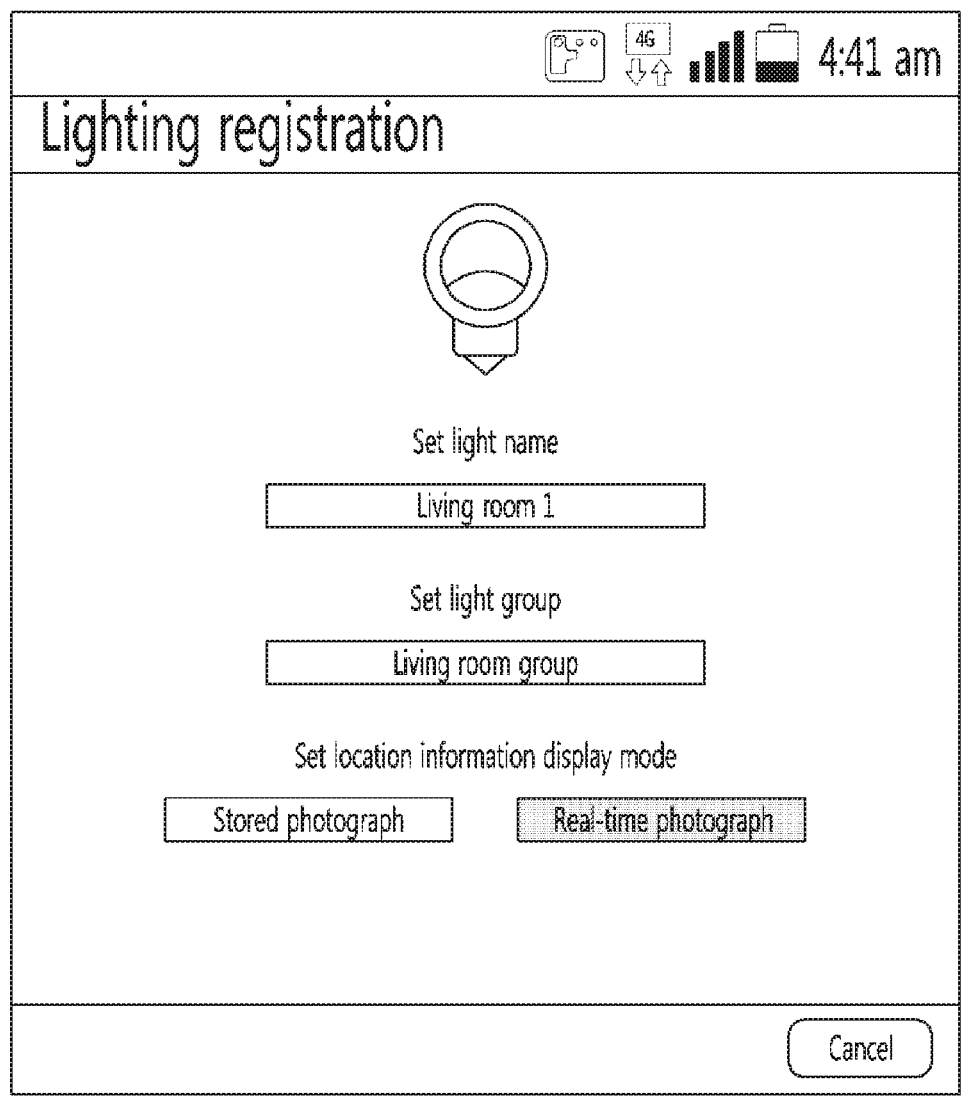
[FIG. 22]

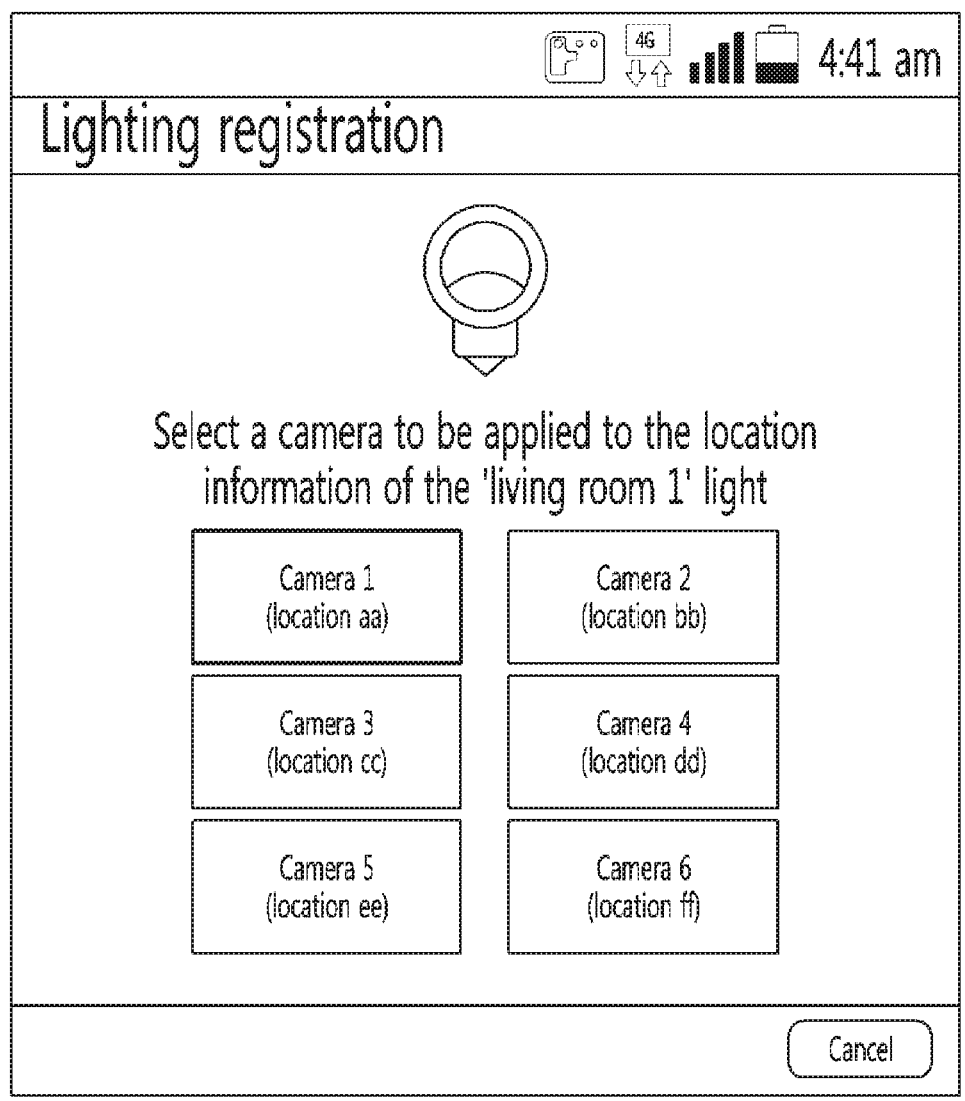
[FIG. 23]

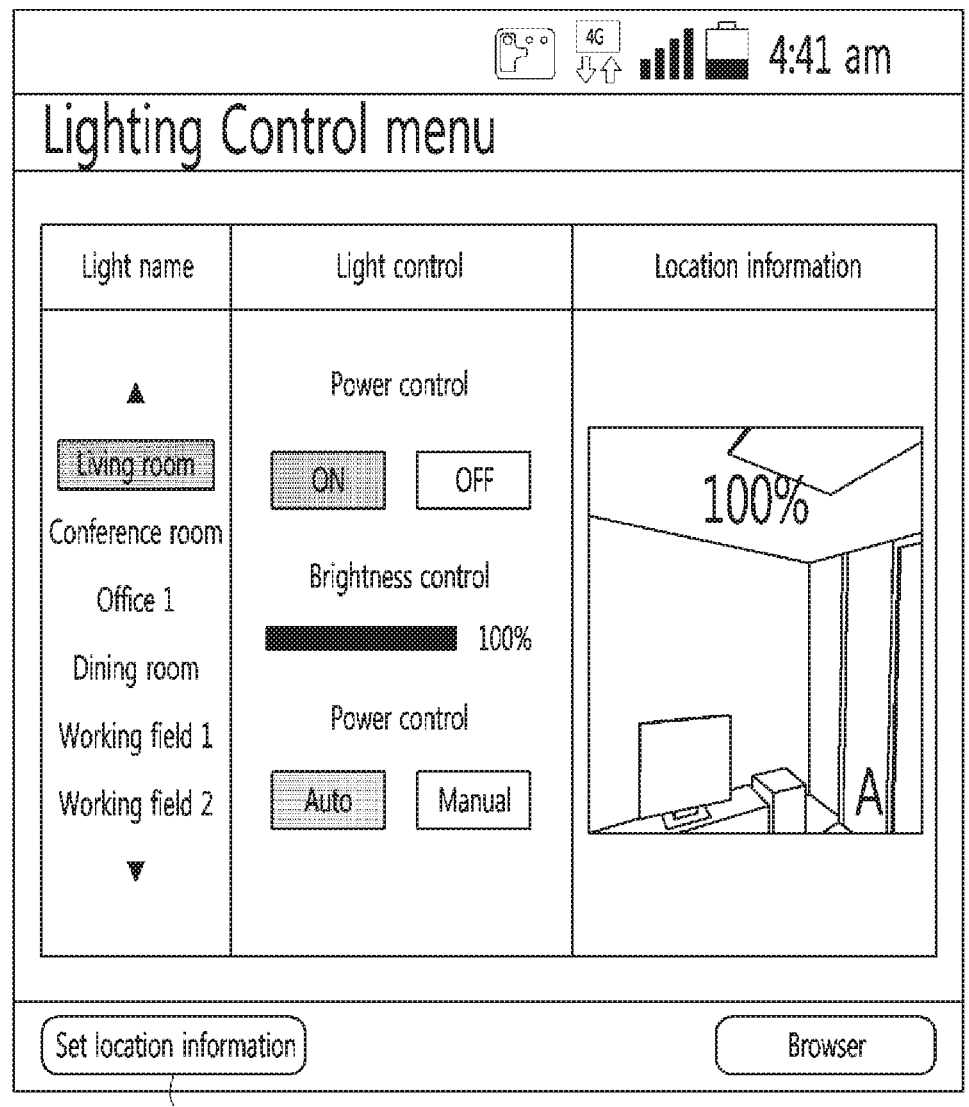
[FIG. 24]

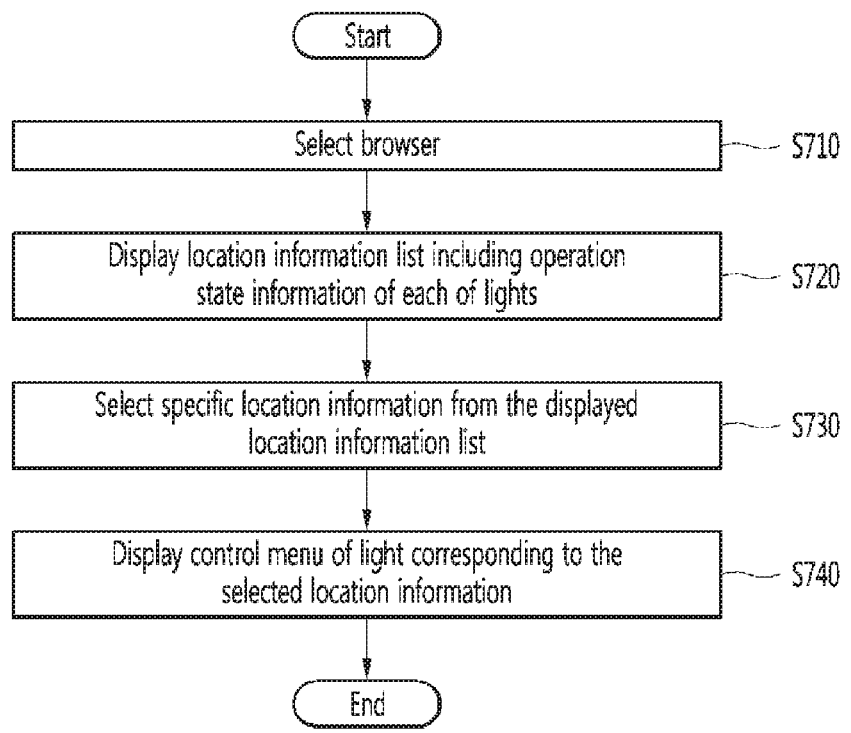
[FIG. 25]

[FIG. 26]
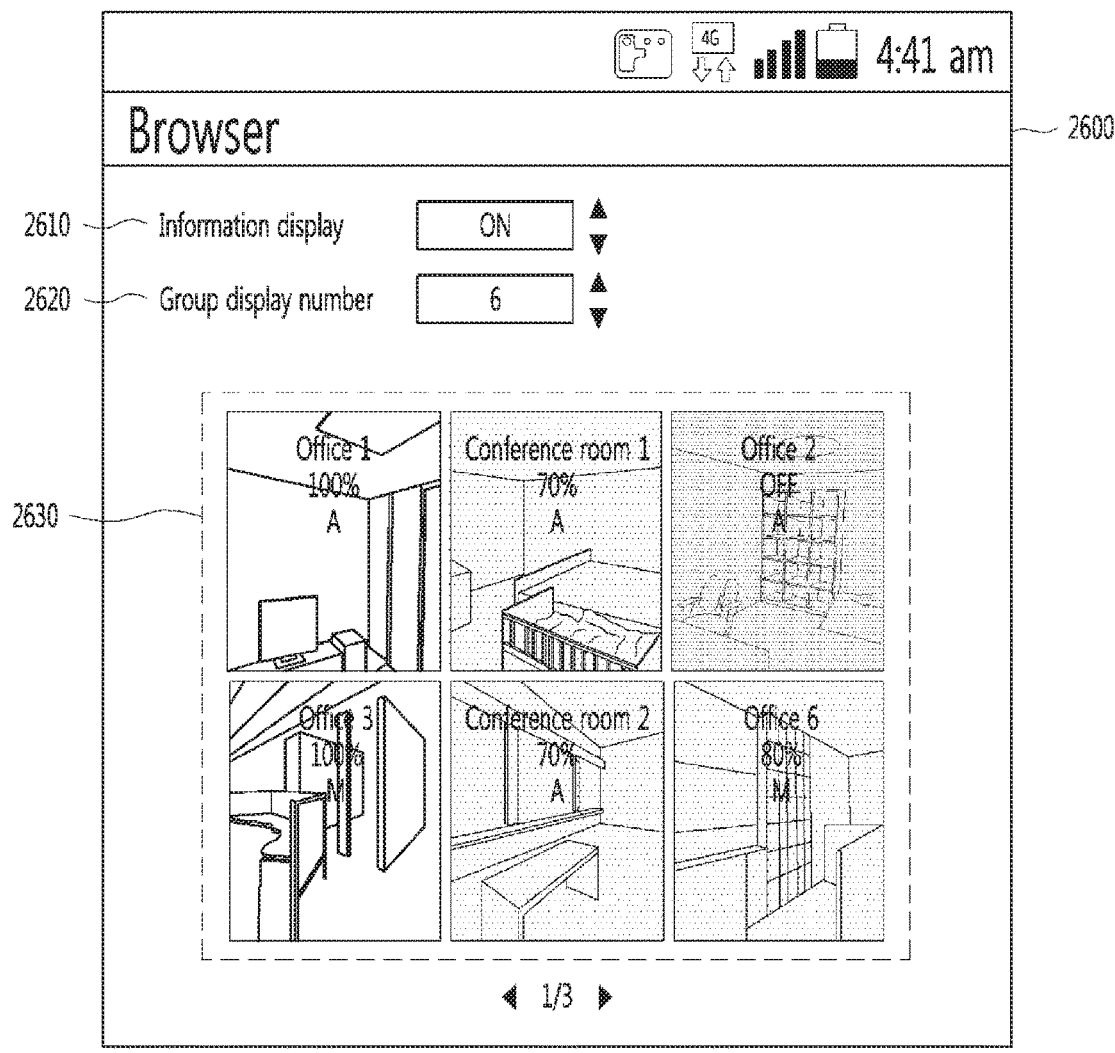

[FIG. 27]
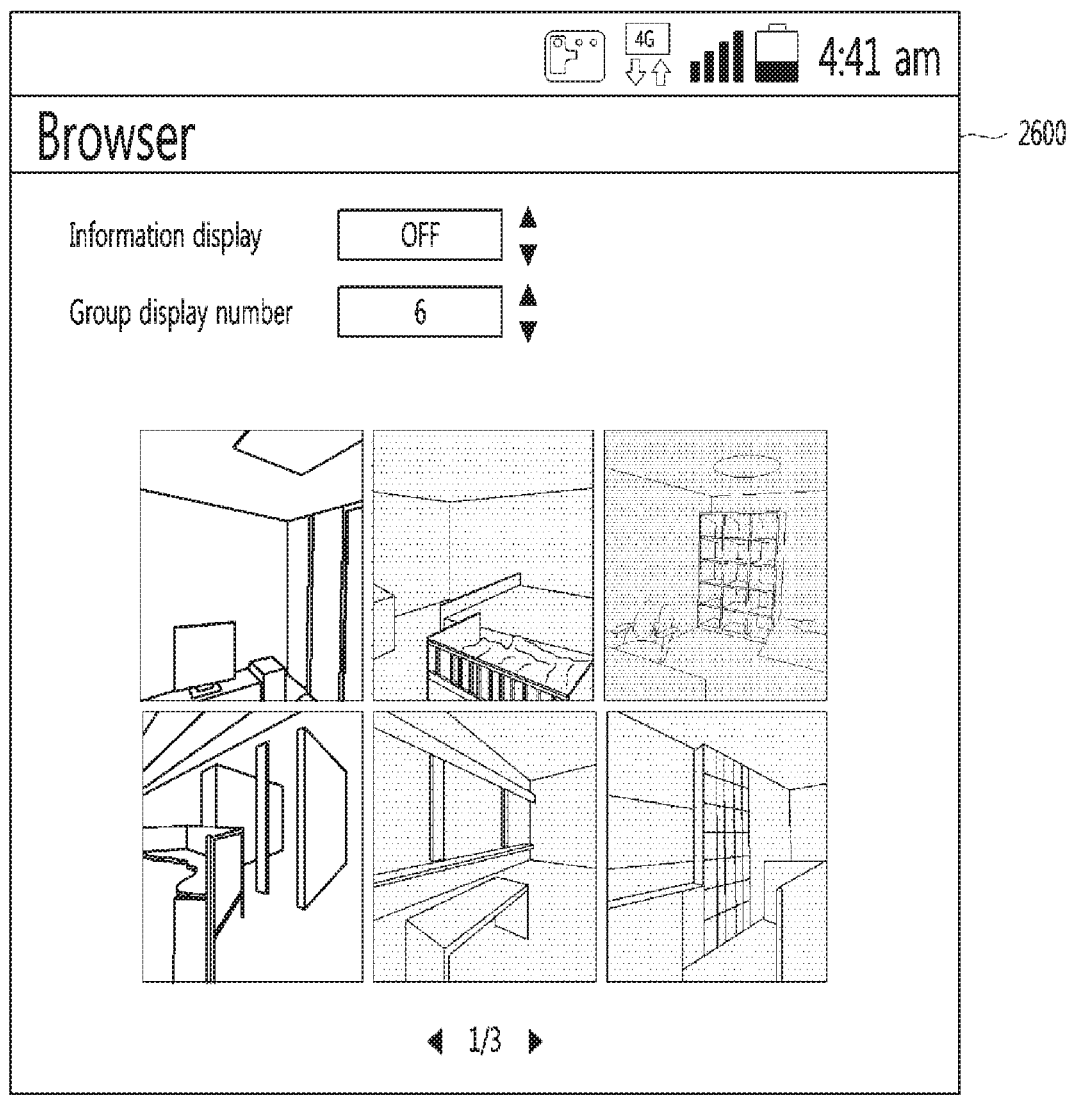

[FIG. 28]
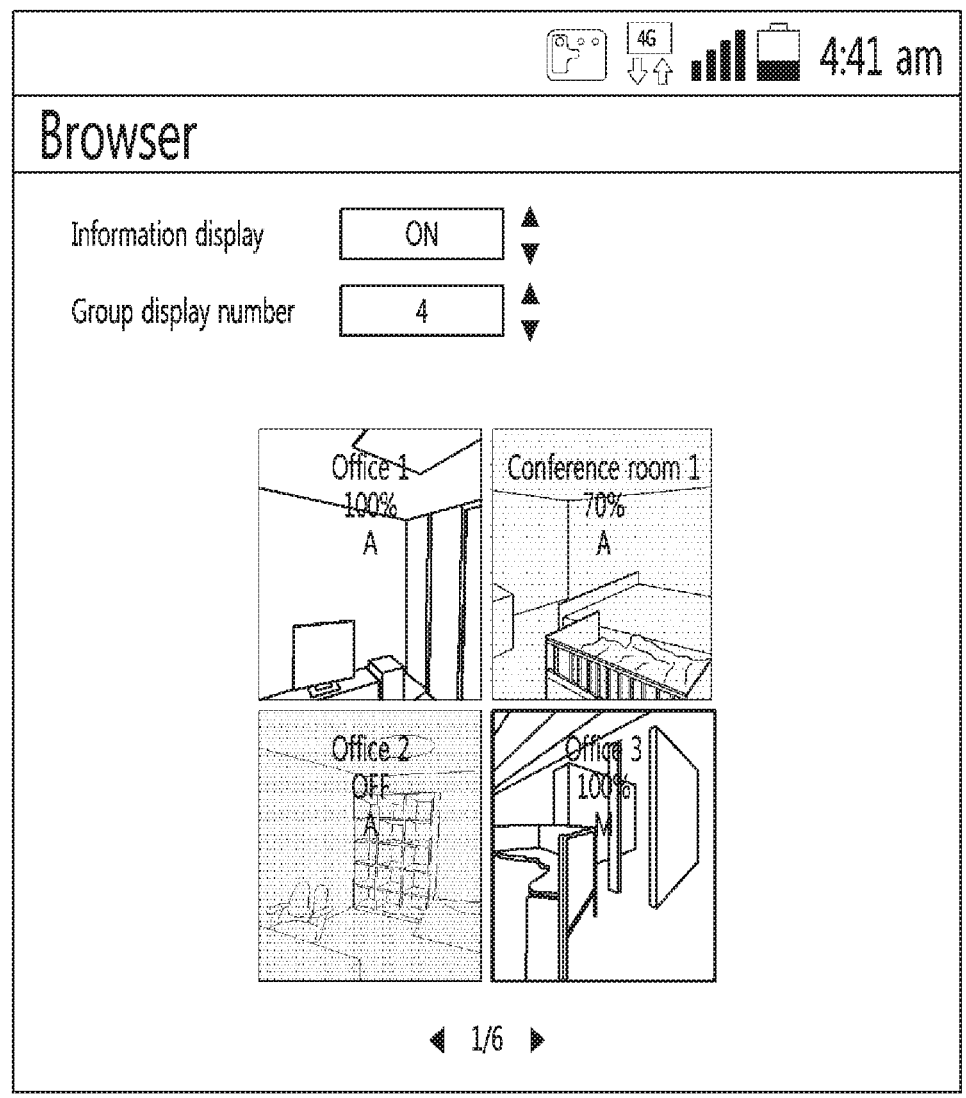

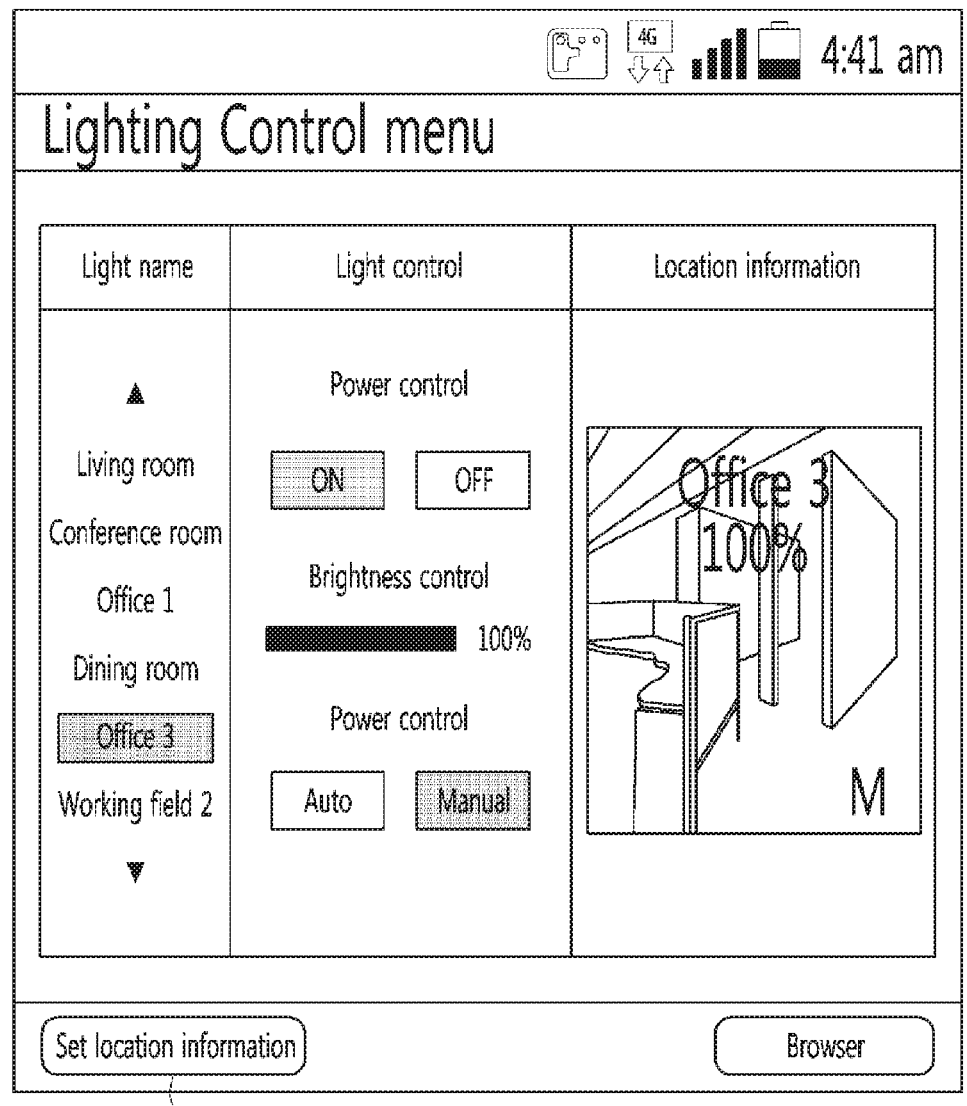

LIGHT CONTROL APPARATUS AND LIGHT CONTROL METHOD THEREOF

CROSS-REFERENCE TO RELATED APPLICATION

This application is the U.S. national stage application of International Patent Application No. PCT/KR2015/007898, filed Jul. 28, 2015, which claims priority to Korean Application No. 10-2014-0107018, filed Aug. 18, 2014, the disclosures of each of which are incorporated herein by reference in their entirety.

BACKGROUND

1. Field

The embodiment relates to a light control apparatus, and more particularly, to a light control apparatus capable of displaying a graphical user interface for controlling a light apparatus and a method of controlling a light using the same.

2. Background

In general, control of a light apparatus is performed by operating a power switch which is one-to-one connected to the light apparatus through a wire.

As described above, when the light apparatus is controlled by using a switch, a patient, a senior citizen or an infirm who cannot move freely, and children who cannot reach the switch may feel inconvenience in turning on or off the light apparatus.

Meanwhile, recently, the market in wireless lighting control that wirelessly controls light of an office or a store in a large building or home has been increased. A communication module is required to be installed into the light apparatus in order to wirelessly control the light apparatus.

In order to control a specific light apparatus of a plurality of light apparatuses, a light control signal must be wirelessly transmitted to a communication module mounted to the specific light apparatus trough a gateway.

In this case, an user selects a target light apparatus by using a graphical user interface displayed on a light control apparatus such as a mobile terminal, and changes an operating condition of the selected light apparatus.

FIG. 1 is a view illustrating a graphical user interface for controlling light according to the related art.

Referring to FIG. 1, a conventional graphical user interface has grouped a plurality or single light apparatus(es) into a group, and thereby controlled at least one light apparatus belonging to the same group.

The graphical user interface includes a group name displaying area 10 on which a group name is displayed, an operation mode displaying area 20 on which an operation mode is displayed, and a brightness information displaying area 30 on which a brightness level is displayed.

In addition, the user selects one of the plurality of light groups displayed on the group name displaying area 10.

Also, the user changes an item displayed on the operation mode displaying area 20 or the brightness information displaying area 30 by selecting any one of the light groups, and changes the operation mode or the brightness level of the selected light group.

The graphical user interface according to the related art displays only a simple group name as described above for selecting one of the plurality of light groups.

Thus, the user must select a desired light group or light apparatus by only looking at the simple group name.

However, as described above, since the information of the light group or the light apparatus is displayed with the simple group name only, the user may not intuitively recognize where the light group or the light apparatus is installed in the actual spot, and accordingly, there is a problem that the user may not easily select a desired light group or a light apparatus.

SUMMARY

The embodiment according to the present invention provides a light control apparatus providing a graphical user interface which enables to intuitively recognize each light group or an actual installed location of a light apparatus and a method of controlling a light using the same.

Also, the embodiment of the present invention provides a light control apparatus providing a graphical user interface which enables to intuitively recognize each light group or a current operating state of a light apparatus and a method of controlling a light using the same.

Meanwhile, the technical objects to be accomplished by the embodiments may not be limited to the above objects, and other technical objects of the embodiment will be clearly understood by those skilled in the art from the following description.

According to embodiments, there is provided a light control apparatus which includes: a touch screen to display a graphical user interface for controlling a light; and a wireless communication unit performing communication with a light and transmitting a control signal set through the graphical user interface to the corresponding light, wherein the graphical user interface includes a first area displaying a name of the light, and a second area displaying location information of the light selected from the first area, and the location information is spot information about an actual installed location of the light selected from the first area.

The graphical user interface further includes a third area on which a control item for setting an operating condition of the light selected from the first area is displayed.

The control item includes at least one of a first control item for setting a power source of the selected light, a second control item for setting brightness of the selected light, and a third control item for setting an operation mode of the selected light.

The location information includes a photo photographed at a spot corresponding to the actual installed location of the selected light.

The location information includes an image provided through a camera installed at the actual installed location of the selected light.

Additional information about the selected light is further displayed on the location information displayed on the second area, and the additional information includes at least one of a name of the selected light, a power state of the selected light, a brightness level of the selected light, and an operation mode of the selected light.

The location information is displayed on the second area based on a display condition according to a current operating state of the selected light.

The current operating state is a brightness level of the selected light, and the display condition includes at least one of a color and a brightness level of the displayed location information.

When the operating condition of the selected light is changed by the control item displayed on the third area, the display condition of the location information of the light displayed on the second area is also changed corresponding to the changed operating condition, and the display condition of the location information includes at least one of a color and a brightness level of the location information.

When a light group in which a plurality of lights are grouped into one group is selected from the first area, location information corresponding to the plurality of lights belonging to the selected light group is respectively displayed on the second area.

The graphical user interface further includes a fourth area on which a browser execution menu for displaying a list of location information about the plurality of lights is displayed.

According to another embodiment, there is provided a method of controlling a light, which includes displaying a graphical user interface for control of a light; setting an operating condition of at least one light in the graphical user interface; and transmitting a control signal corresponding to the set operating condition to the corresponding light, wherein the graphical user interface includes a first area displaying a name of the light, and a second area displaying location information about the light selected from the first area, and the location information is spot information about an actual installed location of the light selected from the first area.

BRIEF DESCRIPTION OF THE DRAWINGS

Embodiments will be described in detail with reference to the following drawings in which like reference numerals refer to like elements, and wherein:

FIG. 1 is a view showing a graphical user interface for controlling a light according to the related art;

FIG. 2 is a block diagram showing a light system according to an embodiment;

FIG. 3 is a block diagram showing an internal configuration of a light control apparatus shown in FIG. 2;

FIG. 4 is a perspective view showing a structure of a light apparatus shown in FIG. 2;

FIGS. 5 to 29 are flowcharts illustrating a method of controlling a light according to an embodiment of the present invention and views showing graphical user interfaces corresponding thereto.

DETAILED DESCRIPTION

The principle of the embodiments will be described below. Therefore, although not specifically described and depicted in the specification, a person having the ordinary skill in the art may realize the principle of the embodiments and may invent various apparatuses within the concept and scope of the embodiment. Further, in principle, conditional terms and embodiments mentioned in the specification shall be obviously intended to understand concept of the embodiments and may not limit the scope of the embodiments.

Further, it shall be understood that all detailed descriptions, which teach a specific embodiments as well as a principle, an aspect and embodiments are intended to include structural and functional equivalents. Further, it should be understood that the equivalents may include equivalents to be developed in the future as well as known equivalents and may include all devices invented for performing the same functions regardless of the structure thereof.

The embodiment provides a light system which is capable of wirelessly controlling a plurality of light apparatuses by using a light control apparatus such as a terminal.

Hereinafter, a light system will be described with reference to FIGS. 2 to 4.

FIG. 2 is a block diagram showing a light system according to an embodiment, FIG. 3 is a block diagram showing an internal configuration of a light control apparatus shown in FIG. 2, and FIG. 4 is a perspective view showing a structure of a light apparatus shown in FIG. 2.

Referring to FIG. 2, the light system according to the embodiment includes a light control apparatus 300 and a light apparatus 100.

The light control apparatus 300 is connected to a plurality of light apparatuses 100 through a wireless network.

The light control apparatus 300 stores an application therein and executes the application stored therein to provide a graphical user interface for controlling the light apparatus 100.

The light control apparatus 300 may be a terminal which may store and execute the application. The terminal may include at least one of a cellular phone, a smart phone, a laptop computer, a terminal for digital broadcasting, a personal digital assistant (PDA), a portable multimedia player (PMP), and a navigation.

However, the embodiment is not limited to the above, and if an apparatus can perform various wireless communications while downloading and installing an application therein, the apparatus may be included in the light control apparatus 300.

The light apparatus 100 is controlled by a dimming device. The light apparatus 100 may include at least one light. Preferably, the light apparatus 100 may include a plurality of lights.

The light control apparatus 300 serves as an input means for receiving a command for controlling the light apparatus 100 from a user. The light control apparatus 300 is connected to the light apparatus 100 through a wireless network to send a control signal corresponding to the command to the light apparatus 100.

The wireless network of the light control apparatus 300 may be determined according to a wireless environment.

For example, the light control apparatus 300 wirelessly communicates with the light apparatus 100 by applying at least one of ZigBee, Bluetooth and Z-wave thereto.

The light control apparatus 300 may be configured as shown in FIG. 3.

Referring to FIG. 3, the light control apparatus 300 may include a control unit 370, an interface 350 and a wireless communication unit 380.

The wireless communication unit 380 may be formed in a main body configuring the light control apparatus 300 and may serve as a communication module (not shown) including a wireless communication chip supporting the corresponding wireless communication network, which is detachably attached to the main body.

The control unit 370 controls the operation of the light control apparatus 300 by using data stored in a memory.

An operation and communication control program/protocol may be stored in the memory and various applications may be downloaded to be stored in the memory.

The interface 350 may receive a control signal from a user and transfer the control signal to the control unit 370, and it may include a microphone, a touchable touch screen and various local buttons.

The control unit 370 provides image data to the interface 350 according to the program stored in the memory and the touch screen of the interface 350 displays a screen corresponding to the image data thereon.

When a user provides a selecting signal to the control unit 370 by touching the touch screen or through various schemes well known in the art, the control unit 370 generates image data corresponding to the selecting signal.

The light apparatus 100 may be configured as shown in FIG. 4.

The light apparatus 100 may include a light module 500 and a communication module 400.

The light module 500 includes an inner case 570 having a connecting terminal 575 at an upper portion of the inner case 570 and an inserting part at a low portion of the inner case 570, a heat radiation body (not shown) into which the inserting part of the inner case 570 is inserted, a light emitting module part including a plurality of light emitting devices which emit light to a bottom surface of the heat radiation body, a guide member 505 coupled to a circumference region of a lower portion of the heat radiation body to allow the light emitting module part to be firmly fixed to the heat radiation body, a lens 510 formed between the guide member 505 and the light emitting module part, and an outer case 580 outside the heat radiation body.

The lens 510 includes a lens opening part 512 into which the communication module 400 is inserted. The communication module 400 is inserted into the lens opening part 512.

The communication module 400 is connected to the connector of a power control part through the lens opening part 512, such that the control signal transmitted through the light control apparatus 300 is transferred to the light module 500.

Thus, the light system including a plurality of light apparatuses 100 which are wirelessly controllable is capable of controlling the light apparatus 100 in real time through the graphical user interface provided through the touch screen of the light control apparatus 300 by executing the application.

Hereinafter, the interface 350 of the light control apparatus 300 will be described in detail.

Although the interface 350 may include various interfaces, the interface 350 described below means the graphical user interface provided through the touch screen of the light control apparatus 300.

Hereinafter, a process of setting an operating condition of the light apparatus 100 by using the graphical user interface provided through the touch screen of the light control apparatus 300 will be described in detail.

FIGS. 5 to 29 are flowcharts illustrating a method of controlling a light according to an embodiment of the present invention and views showing graphical user interfaces corresponding thereto.

Referring to FIG. 5, the light control apparatus 300 selects a control menu for controlling the operation of a light among various functions (S110).

When the control menu for controlling the operation of the light is selected, the light control apparatus 300 displays a graphical user interface for setting and controlling an operating condition of the previously registered light (S120).

That is, referring to FIG. 6, as the control menu is selected, the light control apparatus 300 displays a graphical user interface 610 for setting the operating condition of the light.

The graphical user interface 610 includes a light name displaying area 620, a control item displaying area 630, a location information displaying area 640 and a menu displaying area 650.

In the light name displaying area 620, names corresponding to a plurality of lights registered in the light control apparatus 300 are respectively displayed.

That is, in the light name displaying area 620, a name set corresponding to the registered light is displayed when the light is registered. For example, in the light name displaying area 620, 'living room', 'conference room', 'office 1', 'dining room', 'working field 1', and 'working field 2' corresponding to names of respective lights may be displayed.

In this case, the name of the light selected by the user among the names displayed on the light name displaying area 620 is highlighted.

In other words, in the case in which the 'living room' is selected by the user among the 'living room', 'conference room', 'office 1', 'dining room', 'working field 1', and 'working field 2' displayed on the light name displaying area 620, a name 621 of the selected light is displayed to distinguished from the name of other unselected light.

In the control item displaying area 630, a control item for setting an operating condition of a preselected specific light among a plurality of lights displayed on the light name displaying area 620 is displayed.

In this case, the control item includes a power control item 631 for setting power of the selected light, a brightness control item 632 for setting brightness of the selected light, and an operation mode control item 633 for setting an operation mode of the selected light.

The power control item 631 includes an On item and an Off item.

That is, when the On item is selected through the power control item 631, the power of the specific light selected through the light name displaying area 620 is turned on, and when the Off item is selected through the power control item. 631, the power of the specific light selected through the light name displaying area 620 is turned off.

In addition, the brightness control item 632 displays a menu for setting the brightness of the selected light.

In this case, although a bar graph type of brightness level setting bar is displayed on the brightness control item 632 in the drawing, the embodiment is not limited thereto, and the brightness control item 632 may include an input window which may set a brightness level of the selected light by directly inputting a number corresponding to the brightness.

The operation mode control item 633 displays a menu for setting the operation mode of the selected light. The menu includes an auto mode menu and a manual mode menu.

The auto mode menu is a menu for automatically controlling a light according to a preset schedule. For example, when the brightness level or the power state of the light is set according to a time period and the operation mode of the light is set to the auto mode, the operating state of the light may be automatically controlled according to the brightness level or the power state according to the time period.

The manual mode menu is a menu for manually controlling the light by setting a power state or setting a brightness level by a user.

The location information displaying area 640 displays location information of the selected light through the light name displaying area 620. In this case, the location information enables to intuitively recognize the installed location of the selected light.

To this end, the location information displaying area 640 displays a photo 641 of the actual installation spot of the selected light.

That is, in general, a user selects a specific light to be controlled among a plurality of lights based on the names of the plurality of lights. In this case, the names of the plurality of lights are similarly set, and the installed location of the corresponding light may not be easily recognized by the name alone. For example, when a user wishes to control the light installed in a specific conference room, in the case in which lights of names such as the conference room 1, the conference room 2, and the conference room 3 exist respectively, it is not intuitively recognized which conference room is the one in which the light to be controlled is installed among the conference room 1, the conference room 2, and the conference room 3, and thus it is difficult to select a control target.

Thus, as described above, the embodiment of the present invention provides a graphical user interface including location information which enables to intuitively recognize the installed location of each of the lights corresponding to the respective lights.

Meanwhile, the photo 641 of the actual installation spot of the light may be a previously stored photo, and may be a photo photographed through the spot in real time.

The operation of displaying the photo 641 will be described in more detail below.

Meanwhile, the photo 641 is displayed with a specific display condition. Here, the display condition may be a color or a brightness level.

In this case, the display condition is determined according to the current operating state of the selected light, more specifically, the brightness level of the selected light.

In this case, the display condition is preferably a color. For example, in the case in which the brightness level set about the selected light is 100%, an original photo is displayed on the location information displaying area 640, and in the case in which the brightness level set about the selected light is 50% to 100%, a yellow-colored photo is displayed on the location information displaying area 640, and in the case in which the brightness level set about the selected light is less than 50% to 1% or more, the location information displaying area 640 displays a blue-colored photo, and in the case in which the brightness level set about the selected light is 0%, the location information displaying area 640 may display a gray-colored photo.

In this case, only the original photo may be stored in the light control apparatus 300, and the original photo may be edited according to the current brightness level of the light by executing an internal photo editing program.

Meanwhile, the light control apparatus 300 may adjust the output brightness level of the photo according to the current brightness level of the selected light.

Thus, the user may intuitively recognize not only the actual installed location of the light but also the current operating state of the light based on the photo displayed on the location information displaying area 640.

Meanwhile, the photo 641 displays information corresponding to the current operating state of the corresponding light.

That is, the photo 641 may display as least one of a name 642, a brightness level 643, and an operation mode 644 of the selected light.

The menu displaying area 650 includes a browser menu for browser execution.

The browser collects only the location information displayed on the location information displaying area 640 and displays all of the location information on one screen in order to recognize the operating state of the plurality of previously registered lights at a glance.

The browser will be described in more detail below.

FIG. 5 will be described again.

The light control apparatus 300 selects a first light in the light name displaying area 620 of the graphical user interface (S130).

When the first light is selected, location information including information of the current operating state of the selected first light is displayed (S140). In this case, the location information includes a spot photo of the actual installed location of the selected first light.

In addition, the light control apparatus 300 selects at least one of the control items displayed on the control item displaying area 630 to set and change the operating condition of the selected first light (S150).

Referring to FIG. 7, a graphical user interface 710 includes a light name displaying area 720, a control item displaying area 730, a location information displaying area 740, and a menu displaying area 750.

In this case, when a light 721 having the name 'conference room' is selected among the lights displayed on the light name displaying area 720, a spot photo 741 of the selected light is displayed on the location information displaying area 740.

That is, when a light different from that shown in FIG. 6 is selected, the spot photo 741 displayed on the location information displaying area 740 is changed according to the selected light.

Hereinafter, display condition of the location information displayed on the location information displaying area 740 will be described in more detail.

Referring to FIG. 8, the light control apparatus 300 determines the brightness level currently applied to the selected light (S210).

Thereafter, the light control apparatus 300 determines the set location information corresponding to the selected light, in other words, a spot photo set corresponding to the selected light (S220).

When the brightness level and the spot photo are confirmed, the light control apparatus 300 sets a display condition of the spot photo based on the determined brightness level (S230). In other words, the light control apparatus 300 sets the display color or the brightness level of the spot photo based on the brightness level.

Then, the light control apparatus 300 displays the graphical user interface including the location information by applying the set display condition (S230).

In this case, in the case in which the brightness level of the selected light is changed through the brightness control item displayed on the control item displaying area 630 while the graphical user interface is displayed, the display condition of the spot photo is reset, such that the graphical user interface displays the spot photo reflecting the reset display condition.

That is, referring to FIG. 9, while the graphical user interface 610 as shown in FIG. 6 is displayed, the brightness of the selected light may be changed by the brightness control item among the control items displayed on the control item displaying area 630.

In this case, when the brightness of the light is changed, the display condition of the location information corresponding to the selected light displayed on the location information displaying area 740 is also changed corresponding to the changed brightness of the light.

That is, in the case in which brightness 910 of the selected light is changed from 100% to 70%, the color of a photo 920 displayed on the location information displaying area 740 is also changed from the original photo to a yellow-colored photo.

In addition, the operating state information displayed on the photo 920 is also changed according to the changed brightness level.

Referring to FIG. 10, while the graphical user interface 610 as shown in FIG. 6 is displayed, the brightness of the selected light may be changed by the brightness control item among the control items displayed on the control item displaying area 630.

In this case, when the brightness of the light is changed, the display condition of the location information corresponding to the selected light displayed on the location information displaying area 740 is also changed according to the changed brightness of light.

That is, in the case in which brightness 1010 of the selected light is changed to 0%, the color of a photo 1020 displayed on the location information displaying area 740 is also changed to a gray-colored photo.

In addition, the operating state information displayed on the photo 1020 is also changed according to the changed brightness level.

In addition, referring to FIG. 11, while a graphical user interface as shown in FIG. 6 is displayed, when power of the selected light is turned off by the power control item among the control items displayed on the control item displaying area, the display condition of the location information corresponding to the selected light is also changed according to power off of the light.

That is, when the power of the selected light is turned off 1110, the color of a photo 1120 displayed on the location information displaying area 740 is also changed to a gray-colored photo.

Meanwhile, the light displayed on the light name displaying area may mean a single light or differently therefrom, may mean a light group in which a plurality of lights are grouped into one group.

Thus, a case in which the light group in which a plurality of lights are grouped into one group is selected from the light name displaying area will be described.

Referring to FIG. 13, first, the light control apparatus 300 displays a graphical user interface 1300.

In addition, when a first light is selected in the displayed graphical user interface 1300, it is checked whether the selected first light includes a single light or a plurality of lights. In other words, the light control apparatus 300 determines whether a first light including only one light is selected or a first light in which a plurality of lights are grouped into one group is selected.

In addition, when the first light in which a plurality of lights are grouped into one group is selected (S310), the light control apparatus 300 determines the location information of each of the lights included in the group of the first light and the brightness level set for each of the lights (S320).

Thereafter, the light control apparatus 300 sets a display condition on the location information of each of the lights based on the determined location information and brightness level of each of the lights (S330).

In addition, the light control apparatus 300 displays the graphical user interface including each of the location information of the plurality of lights included in the one group by respectively applying the set display conditions (S340).

The graphical user interface 1300 includes a light name displaying area 1310, a control item displaying area 1320 and a location information displaying area 1330.

In this case, a name 1311 of the light selected by the user among the names displayed on the light name displaying area 1310 is highlighted.

The control item displaying area 1320 displays a control item for setting an operating condition on a preselected specific light among the plurality of lights displayed on the light name displaying area 1310.

In this case, the control item includes a power control item 1321 for setting power of the selected light, a brightness control item 1322 for setting brightness of the selected light, and an operation mode control item 1323 for setting an operation mode of the selected light.

The location information displaying area 1330 displays location information of the selected light through the light name displaying area 1310. In this case, the location information enables to intuitively recognize the installed location of the selected light.

To this end, the location information displaying area 1330 displays a photo 1331 of the actual installation spot of the selected light.

In this case, since the selected light is the light group in which a plurality of lights are grouped into one same group, photos corresponding to all the lights included in the light group are respectively displayed on the location information displaying area 1330.

For example, in the case in which the light group includes lights having names such as 'office 1', 'office 2', 'office 3', 'office 4', 'office 5' and 'office 6', the location information displaying area 1330 displays spot photos respectively corresponding to the office 1 to office 6.

In this case, the name of the corresponding light, the currently set brightness level, and information of the currently set operation mode are respectively displayed on the spot photo of each of the lights.

Thus, the user may easily recognize not only the installed location of a plurality of lights bundled into one group but also the current operating state.

In this case, the display condition of the photo displayed corresponding to each of the lights may be applied differently. That is, since the brightness level of the light of the office 1 is 100%, the photo of the spot corresponding to the office 1 may be the original photo. On the other hand, since the brightness level of the light of the office 2 is 70%, the photo corresponding to the office 2 may be an edited photo in a yellow color of the original photo.

Again, referring to FIG. 12, the light control apparatus 300 determines whether the location information of any one specific light is selected on the graphical user interface on which the location information of each of the plurality of lights is respectively displayed (S350).

In addition, when the location information of the specific light is selected, the light control apparatus 300 displays only the location information corresponding to the selected specific light on the location information displaying area 1330 (S360).

That is, referring to FIG. 14, when the location information corresponding to the office 6 is selected in a state that the graphical user interface as shown in FIG. 13 is displayed, the location information displaying area 1330 displays the location information corresponding to the light having the name of the selected office 6, in other words, a photo.

Thereafter, a step of setting a name, a light group, and a location information display condition of the light through a registration procedure of the light will be described.

Referring to FIG. 15, the light control apparatus 300 searches for unregistered lights among the surrounding light (S410). The searching of the unregistered light acquires a unique address of a communication module by searching for the communication module mounted in the light apparatus, so that the searching of the unregistered light may be performed by determining whether the acquired unique address is an existing registered address.

FIG. 16 shows a light searching picture.

Referring to FIG. 16, a light searching picture 1600 displays an icon 1610 corresponding to the searched light and a map 1620 for the entire space in which the light is installed.

Then, when the unregistered light is searched, the light control apparatus 300 displays the icon 1610 corresponding to the number thereof.

In addition, the map 1620 is for setting an actual installed location of the searched light.

Again, referring to FIG. 15, when the unregistered light is searched by the searching operation, the registration procedure for the searched light is performed.

To this end, the light control apparatus 300 displays a light registering picture and sets the information of the searched light on the displayed light registering picture.

First, the light control apparatus 300 sets a light name of the searched light (S420).

Thereafter, in the case in which the searched light is to be grouped with other lights, the light control apparatus 300 sets a group to which the lights will be belong (S430).

In addition, the light control apparatus 300 determines a location information display condition for displaying the location information of the searched light (S440).

FIG. 17 shows a light registering picture.

Referring to FIG. 17, a light registering picture includes an area 1710 for displaying an icon for a light to be registered, a name setting area 1720 for setting a name of the light, a light group setting area 1730 for setting a group to which the light belongs, and a location information display mode setting area 1740 for displaying the location information of the light.

Thus, the user may set the light name for the light to be registered by inputting the name of the light in the name setting area 1720.

In addition, the user may select a light group to which the light belongs by selecting the light group setting area 1730.

FIG. 18 shows a light group selecting picture.

Referring to FIG. 18, when a light group setting command is input through the light group setting area 1730, the light control apparatus 300 displays a light group selecting picture.

A plurality of previously registered light groups are displayed on the light group selecting picture.

In addition, the user may set a light group to which the light to be registered belongs by selecting one of the displayed plurality of light groups.

In addition, the user may set a location information display mode of the light to be registered through the location information display mode setting area 1740.

That is, referring to FIG. 19, when a stored photo display mode is selected in the location information display mode setting area 1740 (S510), the light control apparatus 300 displays a list of previously stored photos (S520).

FIG. 20 shows a list of stored photos.

Referring to FIG. 20, when the stored photo display mode is selected as the location information display mode of the light, the light control apparatus 300 displays a list of previously stored photos in a storage unit.

In addition, the user selects a spot photo about the actual installed location of the light to be registered on the displayed list (S530).

In this case, only the photos photographed at the actual location of the light are included in the list based on the actual location of the light to be registered.

In addition, the user may select one of the spot photos on the list, and when the photo is selected, the light control apparatus 300 registers the selected photo as the location information of the light (S540).

Thus, when the graphical user interface is displayed, the light control apparatus 300 displays the selected photo as the location information of the registered light.

In addition, referring to FIG. 21, when a real-time photo display mode is selected in the location information display mode setting area 1740 of the picture as shown in FIG. 22 (S610), the light control apparatus 300 displays a camera list including a previously registered camera and information about an installed location of the camera (S620).

FIG. 23 shows a camera list.

Referring to FIG. 23, when the real-time photo display mode is selected as the location information display mode of the light, the light control apparatus 300 displays a list of cameras previously registered in the storage unit.

The camera may be a monitoring camera installed with the light in a space where the light is installed, and monitoring the space where the light is installed.

In addition, the user selects a camera installed at an installed location of the light on the displayed camera list (S630).

In this case, only the camera installed at the installed location of the light is included in the list based on the actual location of the light to be registered.

In addition, the user may select any one of the cameras on the camera list, and when the camera is selected, the light control apparatus 300 registers the selected camera as location information of the light (S640).

Thus, when the graphical user interface is displayed, the light control apparatus 300 displays the photo photographed through the selected camera as the location information of the registered light.

That is, at the time of displaying the graphical user interface, the light control apparatus 300 determines the camera in which the specific light selected from the user is correspondingly installed, and displays a photo (which may be a moving picture) photographed through the determined camera in the location information displaying area.

Thus, the user may monitor a real-time situation of the spot in which the light is installed while controlling the light.

Meanwhile, although the location information display method of the light may be set in the registration procedure of the light, the embodiment is not limited thereto, and the location information display method of the light may be set or changed in the displayed graphical user interface.

That is, referring to FIG. 24, the menu item of the graphical user interface provided in the embodiment may include a location information setting menu 2410.

In addition, the user may set or change the location information display mode about the specific light selected in the light name selection area by using the location information setting menu 2410.

Hereinafter, a browser screen provided by the present disclosure will be described.

The displayed graphical user interface includes a browser menu.

The browser collects only the location information displayed on the location information displaying area 640 and displays all of the location information on one screen in order to recognize the operating states of a plurality of previously registered lights at a glance.

Referring to FIG. 25, when the browser menu is selected in the graphical user interface (S710), the light control apparatus 300 displays a location information list including operating state information of each of the lights (S720). In this case, the displayed location information list may be the browser.

FIG. 26 shows a browser screen provided by the embodiment.

Referring to FIG. 26, a browser screen 2600 includes a first setting menu 2610 and a second setting menu 2620 for setting a display mode of the browser screen 2600.

The first setting menu 2610 is a menu for setting whether or not to display information of the operating state of the corresponding light in the location information of each light.

That is, the name of the corresponding light, the currently set brightness level and the operation mode are displayed in the location information of each of the lights. Thus, the user may set whether to display information about the light name, the brightness level and the operation mode displayed in the location information by using the first setting menu 2610.

The second setting menu 2620 is a menu for setting the number of pieces of location information displayed on one screen.

In addition, the browser screen 2600 includes a location information displaying area 2630 on which location information corresponding to each light is displayed.

The location information displaying area 2630 displays location information corresponding to each light, in other words, a spot photo of the location where each of the lights is installed.

In this case, the number of spot photos displayed on one screen is determined by the number of group displays set through the second setting menu 2620.

In addition, the display condition of the spot photo displayed on the location information displaying area 2630 is determined according to the current brightness level of the corresponding light.

In addition, information of the current operating state of each light is displayed on the spot photo displayed on the location information displaying area 2630.

Referring to FIG. 27, when the first setting menu 2610 is set to 'off' in a state in which a screen as shown in FIG. 26 is displayed, the operating state information of each light is not displayed on the spot photo displayed on the location information displaying area 2630.

In addition, referring to FIG. 28, when the number of group displays is set to 4 through the second setting menu 2620 in a state in which the screen as shown in FIG. 26 is displayed, only location information corresponding to four lights is displayed on one screen.

In this case, the size of the location information displayed on the location information displaying area 2630 may increase as the number of group displays decreases, and the size of the location information displayed on the location information displaying area 2630 may decrease as the number of group displays increases.

In addition, when the location information corresponding to any one specific light is selected in a state in which the browse screen is displayed, the light control apparatus 300 displays a graphical user interface for controlling the light corresponding to the selected location information as shown in FIG. 29.

The embodiment according to the present invention provides a light control apparatus providing a graphical user interface which enables to intuitively recognize each of the light groups or the actual installed location of the light apparatus and a method of controlling a light using the same.

Also the embodiment of the present invention provides a light control apparatus which provides a graphical user interface which enables to intuitively recognize each of the light groups or a current operating state of the light apparatus and a method of controlling a light using the same.

According to the embodiment of the present invention, in the graphical user interface for controlling the operating state of the respective lights, a photo photographed at the installed location of each of the lights is provided as location information of each of the lights so that the location where each of the lights is actually installed may be intuitively recognized.

In addition, according to the embodiment of the present invention, in the graphical user interface for controlling the operating state of each light, a photo photographed through a camera mounted on the installation location of each of the lights is provided as location information of each of the lights, so that a spot situation of the location where each of the lights is installed may be recognized in real time.

In addition, according to the embodiment of the present invention, by changing the display condition of the location information displayed corresponding to the light according to the operating state of the light, the operating state of the light may be easily recognized even if only the location information is checked.

In addition, according to the embodiment of the present invention, the operating state information of the light is provided in the location information of the light, so that the operating state of the light may be recognized at a glance.

Meanwhile, the technical objects to be accomplished by the embodiments may not be limited to the above objects, and other technical objects of the embodiment will be clearly understood by those skilled in the art from the following description.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A light control apparatus comprising:
   a touch screen to display a graphical user interface for controlling a plurality of lights; and
   a wireless communication unit performing communication with the plurality of lights and transmitting a control signal set through the graphical user interface to one or more lights of the plurality of lights,
   wherein the graphical user interface comprises:
   a first area displaying names of the plurality of lights;
   a second area displaying location information of a light whose name is selected by a user from the names of the plurality of lights of the first area; and
   a third area in which a control item for setting an operating condition of the light selected is displayed;
   wherein the location information comprises an image captured to provide a view of a location surrounding the selected light,
   wherein the image is displayed in the second area based on a display condition according to a current operating state of the selected light, wherein the current operating state comprises a brightness level of the selected light, and wherein the display condition includes a display brightness level of the image;

wherein, when the operating condition of the selected light is changed by the control item displayed in the third area, the display condition of the image displayed in the second area is changed corresponding to the changed operating condition; and wherein the image is displayed in the second area based on the display brightness level, which is adjusted according to a changed brightness level of the selected light.

2. The light control apparatus of claim 1, wherein the control item includes at least one of a first control item for setting a power source of the selected light, a second control item for setting brightness of the selected light, and a third control item for setting an operation mode of the selected light.

3. The light control apparatus of claim 2, wherein the graphical user interface further includes a fourth area in which a browser execution menu for displaying a location information list of the plurality of lights is displayed.

4. The light control apparatus of claim 1, wherein the image is provided by a camera installed at a location of installation of the selected light.

5. The control apparatus of claim 1, wherein additional information of the selected light is displayed with the location information displayed in the second area, and wherein the additional information includes at least one of the name of the selected light, a power state of the selected light, the brightness level of the selected light, and an operation mode of the selected light.

6. The light control apparatus of claim 1, wherein, when a light group having a plurality of lights is selected from the first area, the second area is divided into a plurality of regions based on a number of the plurality of lights, and wherein images of the plurality of lights of the selected light group are displayed in the plurality of regions, respectively.

7. A light control method comprising:

displaying a graphical user interface for control of a plurality of lights;

setting an operating condition of at least one light of the plurality of lights in the graphical user interface; and transmitting a control signal corresponding to the set operating condition to the at least one light, wherein the graphical user interface includes:

a first area displaying a name of the at least one light;

a second area displaying location information of the at least one light whose name is selected by a user from the first area; and a third area in which a control item for setting an operating condition of the at least one light selected from the first area is displayed;

wherein the location information comprises an image captured to provide a view of a location surrounding the selected at least one light, wherein the image is displayed in the second area based on a display condition according to a current operating state of the selected at least one light, wherein the current operating state comprises a brightness level of the selected at least one light, and wherein the display condition includes a display brightness level of the image;

wherein, when the operating condition of the selected at least one light is changed by the control item displayed in the third area, the display condition of the image displayed in the second area is changed corresponding to the changed operating condition; and wherein the image is displayed in the second area based on the display brightness level, which is adjusted according to a changed brightness level of the selected at least one light.

8. The light control method of claim 7, wherein the control item includes at least one of a first control item for setting a power source of the selected at least one light, a second control item for setting brightness of the selected at least one light, and a third control item for setting an operation mode of the selected at least one light.

9. The light control method of claim 8, wherein the graphical user interface further includes a fourth area in which a browser execution menu for displaying a location information list of the plurality of lights is displayed.

10. The light control method of claim 7, wherein the image is provided by a camera installed at a location of installation of the selected at least one light.

11. The light control method of claim 7, wherein additional information of the selected at least one light is displayed with the location information displayed in the second area, and wherein the addition information includes at least one of the name of the selected at least one light, a power state of the selected at least one light, the brightness level of the selected at least one light, and an operation mode of the selected at least one light.

12. The light control method of claim 7, wherein, when a light group having a plurality of lights is selected from the first area, the second area is divided into a plurality of regions based on a number of the plurality of lights, and wherein images of the plurality of lights of the selected light group are displayed in the plurality of regions, respectively.

* * * * *